United States Patent
Nagai et al.

(10) Patent No.: US 7,397,616 B2
(45) Date of Patent: Jul. 8, 2008

(54) OPTICAL COMMUNICATION MODULE AND OPTICAL ELEMENT FOR OPTICAL COMMUNICATION MODULE

(75) Inventors: Fumio Nagai, Hachioji (JP); Nobuyoshi Mori, Hachioji (JP); Yuichi Atarashi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 22 days.

(21) Appl. No.: 11/401,333

(22) Filed: Apr. 11, 2006

(65) Prior Publication Data
US 2006/0238896 A1    Oct. 26, 2006

(30) Foreign Application Priority Data
Apr. 21, 2005    (JP)    ............... 2005-123084

(51) Int. Cl.
*G02B 3/08*    (2006.01)
*G02B 6/34*    (2006.01)
*G02B 13/18*    (2006.01)

(52) U.S. Cl. ......................................... 359/741; 385/37

(58) Field of Classification Search ......... 359/741–743, 359/571, 574; 385/37; 398/87, 149, 139–141
See application file for complete search history.

(56) References Cited

U.S. PATENT DOCUMENTS 6,120,191 A    9/2000    Asakura et al.

2002/0118427 A1    8/2002    Hendriks et al.
2004/0032586 A1    2/2004    Nagasaka et al.
2004/0175186 A1*   9/2004    Tabata .................. 398/141

OTHER PUBLICATIONS

Dammann H., "Color Separation Gratings", Applied Optics, vol. 17, No. 15, Aug. 1978, pp. 2273-2279.

* cited by examiner

*Primary Examiner*—Alicia M Harrington
(74) *Attorney, Agent, or Firm*—Finnegan, Henderson, Farabow, Garrett & Dunner, L.L.P.

(57) ABSTRACT

An optical communication module includes a first light-receiving element with a receiving surface in which a light flux with a wavelength $\lambda 1$ emitted from an end surface of an optical fiber enters; a light-emitting element for emitting a light flux with a wavelength $\lambda 2$; and a first optical element arranged between the first light-receiving element and the light-emitting element, and the end surface of the optical fiber. The first optical element includes a first optical surface with a positive refractive power and a second optical surface having a diffractive structure. One of the first optical surface and the second optical surface is divided into at least a first optical functional surface and a second optical functional surface through a step difference.

26 Claims, 16 Drawing Sheets

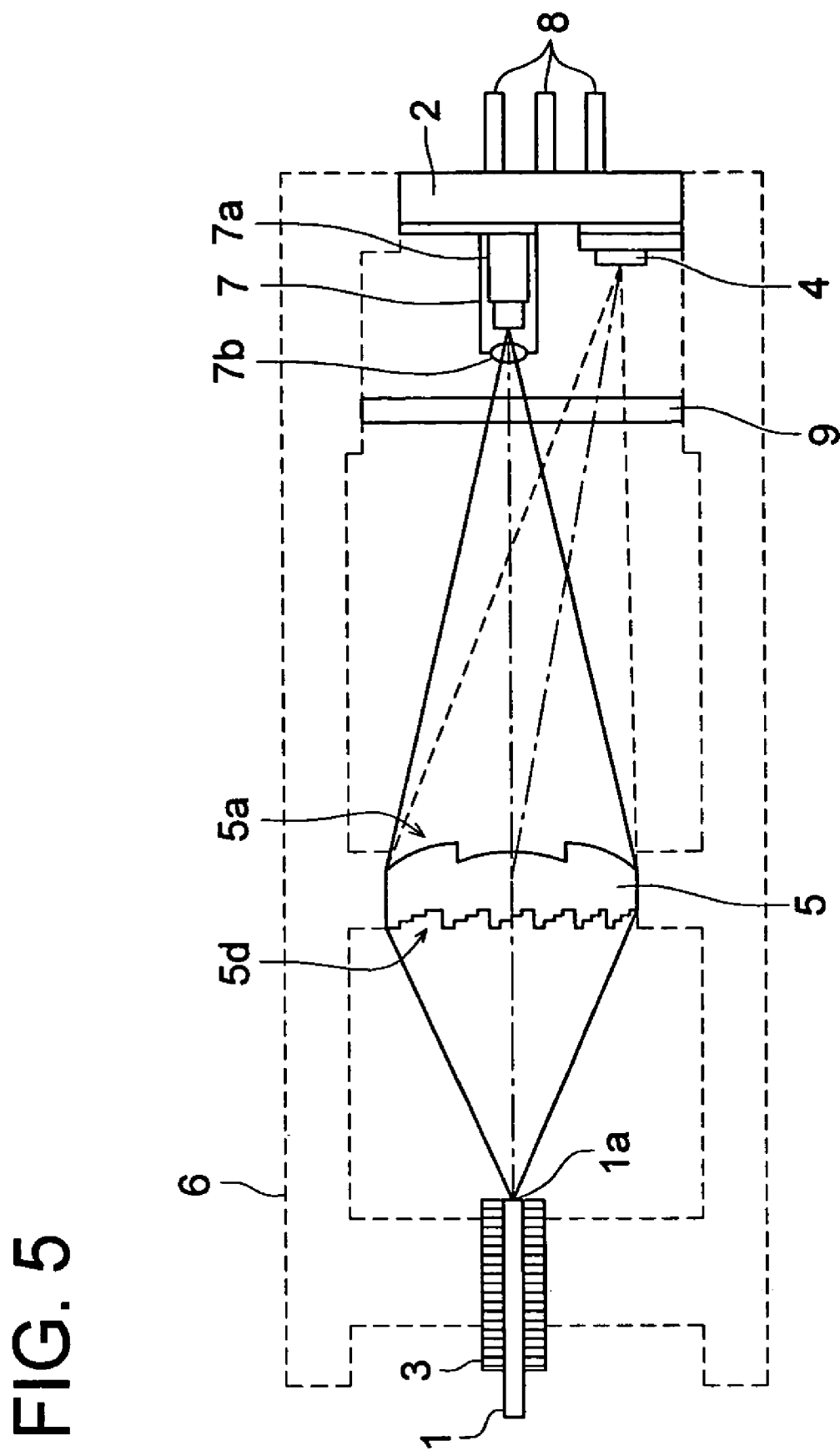

FIG. 11
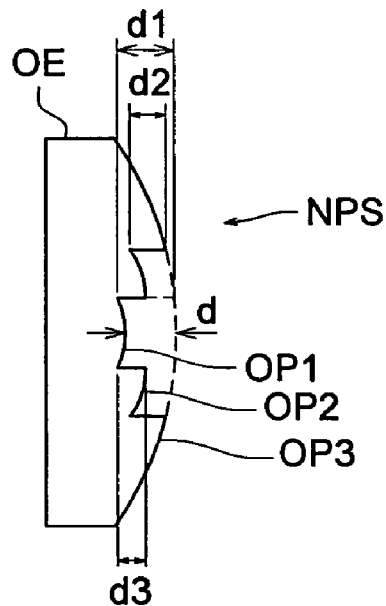
FIG. 12 (a)　　　FIG. 12 (b)
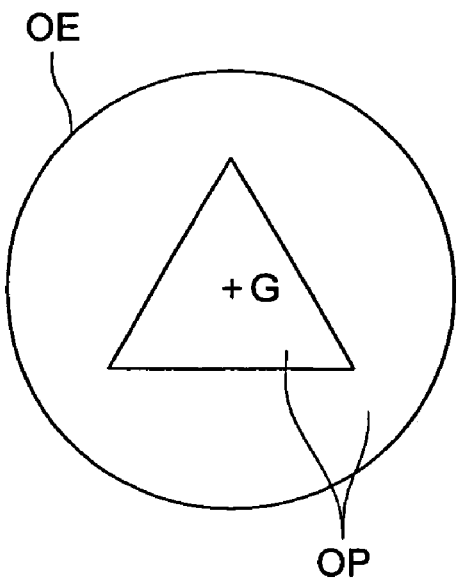 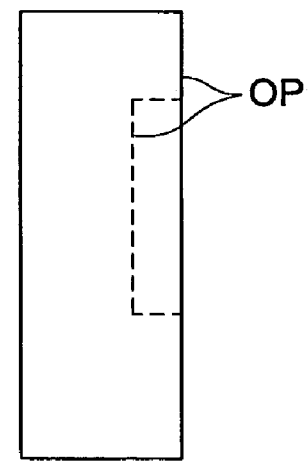

US 7,397,616 B2

OPTICAL COMMUNICATION MODULE AND OPTICAL ELEMENT FOR OPTICAL COMMUNICATION MODULE

This application is based on Japanese Patent Application No. 2005-123084 filed on Apr. 21, 2005 in Japanese Patent Office, the entire content of which is hereby incorporated by reference.

FIELD OF THE INVENTION

The present invention relates to an optical communication module for being attached to the end part of an optical fiber, and receiving optical signal sent through the optical fiber, and transmitting optical signal through the optical fiber.

BACKGROUND OF THE INVENTION

In an optical communication system by means of the bidirectional transmission using the light beams whose wavelength are different, an optical communication module including an optical system having a light-receiving element, light-emitting element and lens is provided to the terminal which transmits and receives optical signal through an optical fiber. In most of the conventional optical communication modules, glass-made lenses are used as an optical element constructing the optical system. However, it is considered that the glass-made lens is replaced with resin-made lens because the glass-made lens is comparatively high in cost. However, an non-negligible refractive index change is generated by the temperature change in a general resin-made lens. For example, it makes difficulty of appropriately forming an image on the end surface of the optical fiber using the light flux emitted from the light-emitting element. Thereby, there is a possibility that the coupling efficiency of the optical fiber is lowered.

On the other hand, diffractive ring-shaped zones are formed on an optical surface of the resin-made light converging lens in the semiconductor laser module written in Patent Document 1. Using the fact that an oscillation wavelength of a light beam from the semiconductor laser changes when a refractive index of the light converging lens changes by a temperature change, the semiconductor laser module conducts a temperature compensation by canceling out a focal point movement following the movement of the oscillation wavelength of the semiconductor laser oscillator to the temperature change and a focal point movement following the refractive index change and thermal expansion or thermal contraction by the temperature change of the resin-made lens.

[Patent Document 1] Tokkaihei No. 11-142696

However, in the semiconductor laser module written in Patent Document 1, the temperature compensation becomes available only when a light beam projected from the light-emitting element is sent to the optical fiber. Herein, an oscillation wavelength of a light beam sent by travering through the optical fiber does not change due to the temperature change occurring at the semiconductor laser module side when the light beam sent from the optical fiber is received by the light-receiving element. Therefore, there is a problem that when the refractive index of the light converging lens changes due to the temperature change, its focal point movement is hard to be suppressed.

Further, it is not preferable that a large number of diffractive ring-shaped zones are formed in the light converging lens as shown in the semiconductor laser module written in Patent Document 1, because the structure is not gotten free from the the coupling efficiency lowering and the light amount lowering affects a large influence on a communication. It is also a problem. A technology in which the diffractive ring-shaped zones are used is widely known conventionally. For example, it is adopted for the spherical aberration correction in the field of the optical pickup apparatus, and its purpose includes achieving compatibility between optical disks with different formats (whose substrate thicknesses are different), the chromatic aberration correction, and the chromatic spherical aberration correction. A focus is finely adjusted by auto-focusing the objective lens, and it is difficult in the design work that the focal point movement by the oscillation shift of the semiconductor laser and the focal point movement by the refractive index change by the temperature change of the resin-made lens and the thermal expansion or thermal contraction are balanced accurately.

SUMMARY OF THE INVENTION

In view of the above described problem of the conventional technology, the present invention provides an optical communication module by which the coupling efficiency of the optical fiber can be enhanced.

A structure relating to the present invention is an optical communication module includes a light-receiving element in which a light flux with a wavelength $\lambda 1$ emitted by an end surface of an optical fiber enters; a light-emitting element for emitting a light flux with a wavelength $\lambda 2$; and a first optical element arranged between the light-receiving element and the light-emitting element, and the end surface of the optical fiber. The first optical element is for conversing the light flux with the wavelength $\lambda 1$ emitted from the end surface of the optical fiber on a light receiving surface of the light-receiving element and for conversing the light flux with the wavelength $\lambda 2$ emitted from the light-emitting element on the end surface of the optical fiber. The first optical element includes a first optical surface having a positive refractive power and a second optical surface having a predefined diffractive structure. One of the first optical surface and the second optical surface is divided into at least a first optical functional surface including an optical axis and a second optical functional surface surrounding the first optical functional surface and arranged through a step difference extended along the optical axis.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which:

FIG. 5 is an outline sectional view of an optical communication module according to the first embodiment;

FIG. 11 is a sectional view of the first optical element OE according to Example 2;

FIGS. 12(*a*) and 12(*b*) are views showing a modification example of the first optical element OE, and FIG. 12(*a*) is a view viewed in the optical axis direction, and FIG. 12(*b*) is a view viewed in the orthogonal direction to the optical axis;

DETAILED DESCRIPTION OF THE INVENTION

Figure 1:
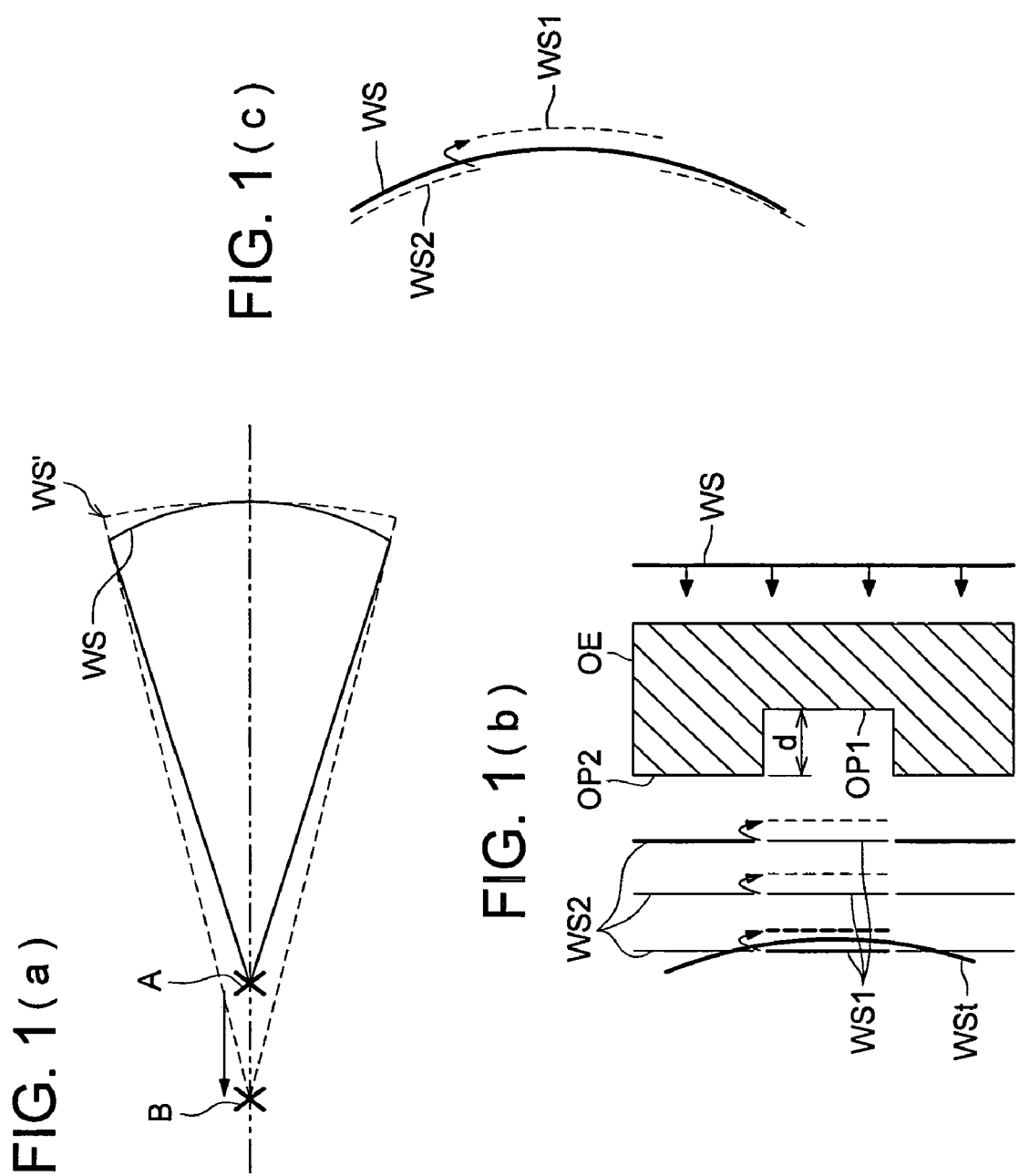
FIGS. 1(a)-1(c) are views for explaining the principle of the structure according to the present invention.

The preferred structure relating to the present invention is explained below.

Item 1 is an optical communication module including: a first light-receiving element with a receiving surface in which a light flux with a wavelength $\lambda 1$ emitted from an end surface of an optical fiber enters; a light-emitting element for emitting a light flux with a wavelength $\lambda 2$ ($\lambda 1 \neq \lambda 2$); and a first optical element arranged between the first light-receiving element and the light-emitting element, and the end surface of the optical fiber. In the other words, the first optical element arranged between the first light-receiving element and the end surface of the optical fiber, and arranged between the light-emitting element and the end surface of the optical fiber. The first optical element converges the light flux with the wavelength $\lambda 1$ emitted from the end surface of the optical fiber on the receiving surface of the first light-receiving element, and converges the light flux with the wavelength $\lambda 2$ emitted from the light-emitting element on the end surface of the optical fiber. The first optical element includes a first optical surface with a positive refractive power and a second optical surface having a diffractive structure. The diffractive structure generates a m-th order diffracted light flux with a larger light amount than any generated diffracted light fluxes with the other diffraction order when the light flux with the wavelength $\lambda 2$ passes through the diffractive structure, and generates a n-th order diffracted light flux with a larger light amount than any generated diffracted light flux with the other diffraction order when the light flux with the wavelength $\lambda 1$ passes through the diffractive structure, where m is an integer including 0, n is an integer and m and n satisfy m≠n. One of the first optical surface and the second optical surface is divided into at least a first optical functional surface including an optical axis and a second optical functional surface surrounding the first optical functional surface through a step difference extending along the optical axis.

Item 2 is the optical communication module of Item 1 which further includes a second optical element arranged between the light-emitting element and the first optical element and the second optical element has a positive refractive power.

Item 3 is the optical communication module of Item 1 or 2 in which the diffractive structure generates a 0-th order diffracted light flux with a larger light amount than any generated diffracted light flux with the other diffraction order when the light flux with the wavelength $\lambda 2$ passes through the diffractive structure, and generates a n-th order diffracted light flux with a larger light amount than any generated diffracted light flux with the other diffraction order when the light flux with the wavelength $\lambda 1$ passes through the diffractive structure, where n is an integer excluding 0. One of the first optical surface of the second optical surface is divided into a plurality of optical functional surfaces provided with at least one step difference extending along the optical axis. The plurality of optical functional surfaces include the first optical functional surface and the second optical functional surface. The number of the divided optical functional surfaces is one of 2 to 4.

Item 4 is the optical communication module of Item 3 in which the number of the divided optical functional surfaces is 2 or 3.

Item 5 is the optical communication module of Item 3 in which each of the divided optical functional surfaces has a geometric center of gravity positioned at an optical axis.

Initially, it is required that the structure whose initial assembled condition is maintained as much as possible without having a movable mechanism for an optical communication module for which the present invention is applied. Further, a scheme for maintaining the focus position (in other words, a scheme for reducing a defocus amount) is required rather than the spherical aberration correction, because so-called NA is small as compared to that of the field of the optical disk.

Explaining detail of this point, the size reduction of the optical communication module using so-called bidirectional communication is required not only for the personal computer, but also for an object of the application to the domestic information device. Following that, both of semiconductor elements in the light receiving side unit and semiconductor elements in the light emitting side unit are down-sized. Particularly, downsized light receiving side element becomes sensitive to the size variation of the light converging spot. Therefore, a scheme for maintaining focal distance constant is required for the optical element in the optical communication module, for the purpose of the coupling efficiency, and thus for a speed up and stabilization of a communication.

Hereupon, as a result of eager consideration, the present inventors design the optical element which does not cause a large coupling efficiency lowering and provides fewer focus position change by the temperature change without requiring the movable parts, and have succeeded in obtaining the optical communication module whose usable temperature range is greatly widened.

The embodiment according to the present invention will be more specifically described below. In the communication module according to the present invention, the temperature rises by a heat generation due to an outputting light from the light-emitting element when the semiconductor light-emitting element is used for the above light-emitting element. Particularly, when the light emitting power is increased, the temperature rising in the optical communication module becomes conspicuous. There is a tendency that the focal distance of the optical element mainly formed by resin becomes long following the refractive index change due to the temperature rise. That is, the extension of the focal distance due to the temperature rise is inevitable. As a result, the coupling efficiency is lowered because the light converging spot shape formed in the light-receiving element becomes ambiguous or the light converging spot on the optical fiber end surface becomes large.

Hereupon, the temperature correction is conducted by dividing one of the first optical surface and the second optical surface into a plurality of optical function surfaces, and shifting such optical function surfaces in the optical axis direction in the embodiment according to the present invention. The number of step differences formed by this shift of optical function surfaces is small number. The step differences are provided to shift the wavefront of the transmitted light flux, and to suppress a variation of a focal distance. Therefore, the step difference is provided in the direction in which the thickness of the optical element is decreased, for example, the optical functional surface positioned at the central part of the optical element is shifted in such a manner that it is recessed in the optical axis direction rather than the optical functional surface positioned at its outside. Further, it is preferable that the number of the optical functional surfaces which are divided and shifted is small number. The scattering light due to the shape error of the divided border part is suppressed, and the maintenance of the coupling efficiency can be intended by suppressing this divided number to small value which is 2 to 4, preferably 2 to 3. A light amount from the optical fiber can be small depending on a condition of the signal receiving side, and there is a possibility that the light amount in the light-receiving element is lost by the lowering of the efficiency of the light converging lens and it bring the lowering of S/N ratio in the technology of Patent Document 1.

Referring to FIGS. 1(*a*)-1(*c*), the principle of the embodiment according to the present invention will be described. In FIG. 1(*a*), the wavefront of the light passed through the first optical element (not shown) becomes a part of the spherical surface as shown by a solid line WS at the reference temperature, and forms the focal point at a position A which is the center of the spherical surface. Herein, the refractive index change due to the temperature becomes not negligible in the first optical element formed of resin when the temperature rises. When a refractive index changes like that, the wavefront of the light passed through the first optical element becomes a part of the spherical surface whose radius is larger as shown by a dotted line WS', and forms the focal point at a position B which is the center of the spherical surface. That is, the focal position is moved in the direction separated from the first optical surface.

Herein, a structure having a first optical element whose optical surface has an optical functional surface which is shifted in the optical axis direction, will be considered. In FIG. 1(*b*), the first optical element OE is shown by a parallel plane for simplification of the description. The first optical functional surface OP1 in a circular shape is formed at the center around the optical axis, and the second optical functional surface OP2 is formed in its periphery.

Herein, when the wavefront WS of the light entering in the first optical element OE is a plane, the wavefront WS1 corresponding to the central first optical functional surface OP1 advances at a phase faster than the wavefront WS2 corresponding to the peripheral second optical functional surface OP2 in the light projected from the first optical element OE. The degree of this advancement (phase difference) depends on the step difference d between the optical functional surfaces OP1 and OP2. Therefore, for example, the phases of the wavefront WS1 and the wavefront WS2 can be coincided to each other at the reference temperature by adjusting the step difference d. Thereby, the wavefront of the light emitted from the first optical element OE can be the same plane as the incident wavefront WS in the appearance. In this case, the focus position (herein, infinite distance) is not changed.

On the one hand, when the temperature of the first optical element OE changes, the refractive index of the material forming the first optical element OE is changed, thereby, the phase difference of the wavefront is changed. For example, when the temperature of the first optical element OE rises, the refractive index is lowered and the phase difference between the wavefront WS1 corresponding to the central first optical functional surface OP1 and the wavefront WS2 corresponding to the peripheral second optical functional surface OP2 is reduced (refer to dotted line shown in FIG. 1(*b*)). Therefore, they form an approximate wavefront WSt having a concave shape, and the focus position is moved from the infinite distance to the proximity position.

As clearly be seen from the above description, the variation of the focus position (refer to FIG. 1(*a*)) caused by the refractive index change of the first optical element due to the temperature change has different variation direction from the variation of the focus position caused by the wavefront change (refer to FIG. 1(*b*)) due to the step difference of the first optical element due to the temperature change. Therefore, the wavefront shape WS of the light passing through the first optical element can be maintained irrespective of the temperature change by making these absolute values almost equal. It suppresses the variation of the focus position (refer to FIG. 1(*c*)). Further, the light amount lowering can be suppressed by providing the optical functional surfaces whose number is less than 4, and preferably less than 3.

Item 6 is the optical communication module of any one of Items 3-5, in which at least one of the divided optical functional surfaces is a ring-shaped zone whose center is placed on the optical axis.

The optical communication module of any one of Items 3-5 in which at least one of the borders of the divided optical functional surfaces may be a polygon when they are observed along the optical axis direction.

The optical communication module of any one of Items 3-5 in which at least one of the borders of the divided optical functional surfaces may be oval (including a circle, hereinafter) when they are observed along the optical axis direction.

The optical communication module of any one of Items 3-5 in which the divided optical functional surfaces may be formed on the first optical surface.

Item 7 is the optical communication module of Item 1 or 2 in which the diffractive structure generates a 0-th order diffracted light flux with a larger light amount than any generated diffracted light flux with the other diffraction order when the light flux with the wavelength λ2 passes through the diffractive structure, and generates the n-th order diffracted light flux with a larger light amount than any generated diffracted light flux with the other diffraction order when the light flux with the wavelength λ1 passes through the diffractive structure, where n is an integer excluding 0. One of the first optical surface of the second optical surface is divided into a plurality of optical functional surfaces provided with a step difference extending along the optical axis. The plurality of optical functional surfaces includes the first optical functional surface and the second optical functional surface. The divided optical functional surfaces satisfy the expression (1):

$$0.05 \leq Sn/S0 \leq 0.068 \qquad (1)$$

Where Sn is an area of a region such that an optical surface having the divided optical functional surfaces is projected in a direction of the optical axis onto a surface perpendicular to the optical axis, and S0 is an area of a region such that when an outermost optical functional surface represents a farthest optical functional surface from the optical axis among the divided optical functional surfaces, the rest of divided optical fictional surfaces inside of the outermost optical functional surface is projected along the optical axis to a perpendicular surface to the optical axis.

In the above structure, each of the divided optical functional surfaces may have a center of gravity which is placed on the optical axis.

In the same manner as the structure written in Item 1, the variation of the focus position due to the temperature change can be suppressed even when the first optical element is formed of resin, because the optical functional surfaces having the step differences are provided in the first optical element. Furthermore, according to the present structure, the following effects can be obtained.

Figure 2:
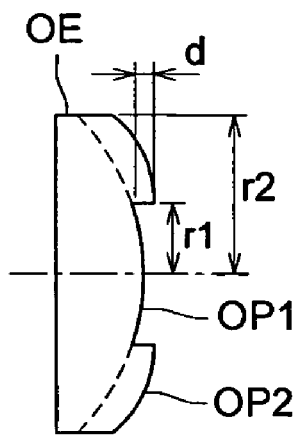
FIGS. 2(a) and 2(b) are views for explaining the principle of the structure according to the present invention.
Figure 2:
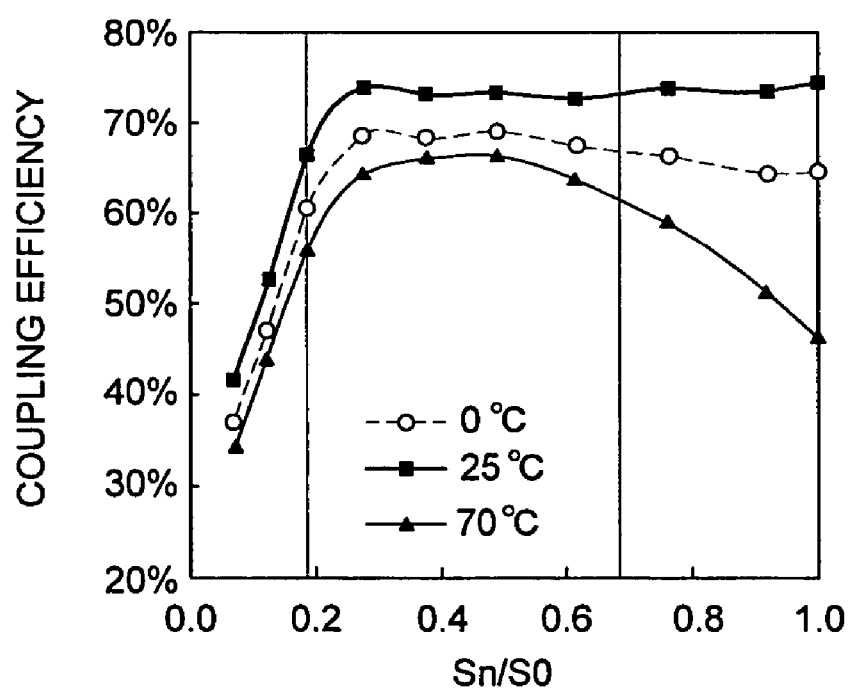

Referring to FIGS. 2(a) and 2(b), the principle of the structure according to the present invention will be described. As shown in FIG. 2(a), the first optical element OE is defined to has the central first optical functional surface OP1 and its peripheral second optical functional surface (the peripheral optical functional surface) OP2. Herein, a region such that the optical surface including the divided optical functional surfaces OP1 are OP2 is projected in the optical axis direction on the surface perpendicular to the optical axis is expressed by $Sn = \pi \cdot r2^2$, and a region such that the optical functional surface OP1 which is inside of the second optical functional surface OP2 is projected in the optical axis direction on the surface perpendicular to the optical axis is expressed by $S0 = \pi \cdot r1^2$, where r1 is a radius of the first optical functional surface OP1, and r2 is a radius of the second optical functional surface OP2 is r2.

In FIG. 2(b), the vertical axis is the coupling efficiency, and the horizontal axis is Sn/S0. According to the consideration result of the present inventors, the coupling efficiency decreases to about a half in the structure which does not has the divided optical functional surfaces (refer to the dotted line in FIG. 2(a), corresponding to Sn/S0=1 in FIG. 2(b)), when the ambient temperature rises from the reference temperature 25° C. to 70° C. In contrast to this, the lowering of the coupling efficiency can be suppressed within 20%, by making Sn/S0 satisfy the expression (1) even when the ambient temperature rises to 70° C. from the reference temperature 25° C.

Item 8 is the optical communication module of Items item 7 in which an area rate of the divided optical functional surface satisfies the following expression (2). Therefore, as shown in FIG. 2(b), the lowering of the coupling efficiency can be suppressed to about 10% even when the ambient temperature rises to 70° C. from the reference temperature 25° C.

$$0.08 \leq Sn/S0 \leq 0.58 \tag{2}$$

Item 9 is the optical communication module of Item 7 or 8 in which at least one of the divided optical functional surfaces is a ring-shaped zone whose center is placed on the optical axis.

Item 10 is the optical communication module of item 9 in which the divided optical functional surfaces are ring-shaped zones whose centers are placed on the optical axis and satisfy the following expression (3):

$$0.22 \leq NAn/NA0 \leq 0.83 \tag{3}$$

where NAn is a numerical aperture of a region corresponding to the rest of divided optical fictional surfaces excluding the outermost optical functional surface, and NA0 is a numerical aperture of the optical surface having the ring-shaped zones. The expression (3) is provided by converting the expression (1) into a numerical aperture.

The optical communication module of item 10 preferably satisfies the following expression (4). The expression (4) is provided by converting the expression (2) into the numerical aperture.

$$0.28 \leq NAn/NA0 \leq 0.77 \tag{4}$$

The optical communication module of any one of Items 7-10 in which at least one of the borders of the divided optical functional surfaces may be a polygon when they are observed along the optical axis direction.

The optical communication module of any one of Items 7-10 in which at least one of the borders of the divided optical functional surfaces may be oval when they are observed along the optical axis direction.

The optical communication module of any one of Items 7-10 in which the divided optical functional surfaces may be formed on the first optical surface.

Item 11 is the optical communication module of Item 1 or 2 in which the diffractive structure generates a 0-th order diffracted light flux with a larger light amount than any generated diffracted light flux with the other diffraction order when the light flux with the wavelength λ2 passes through the diffractive structure, and generates the n-th order diffracted light flux with a larger light amount than any generated diffracted light flux with the other diffraction order when the light flux with the wavelength λ1 passes through the diffractive structure, where n is an integer excluding 0. One of the first optical surface of the second optical surface is divided into a plurality of optical functional surfaces provided with a step difference extending along the optical axis. The plurality of optical functional surfaces include the first optical functional surface and the second optical functional surface. The divided optical functional surfaces satisfy the expression (5):

$$3.1 \, (/\text{mm}) \times \lambda 2 \leq d/f \leq 5.8 \, (/\text{mm}) \tag{5}$$

Where d is a step difference amount, and f is a focal length of the first optical element.

In the above structure, each of the divided optical functional surfaces may have a geometric center of gravity positioned at an optical axis.

In the same manner as the structure written in item 1, the variation of the focus position due to the temperature change can be suppressed even when the first optical element is formed of resin because the optical functional surfaces having the step difference in the first optical element. Furthermore, according to the present structure, the following effects are obtained when the step difference amount d in the optical axis direction of the divided optical functional surface is prescribed.

Figure 3:
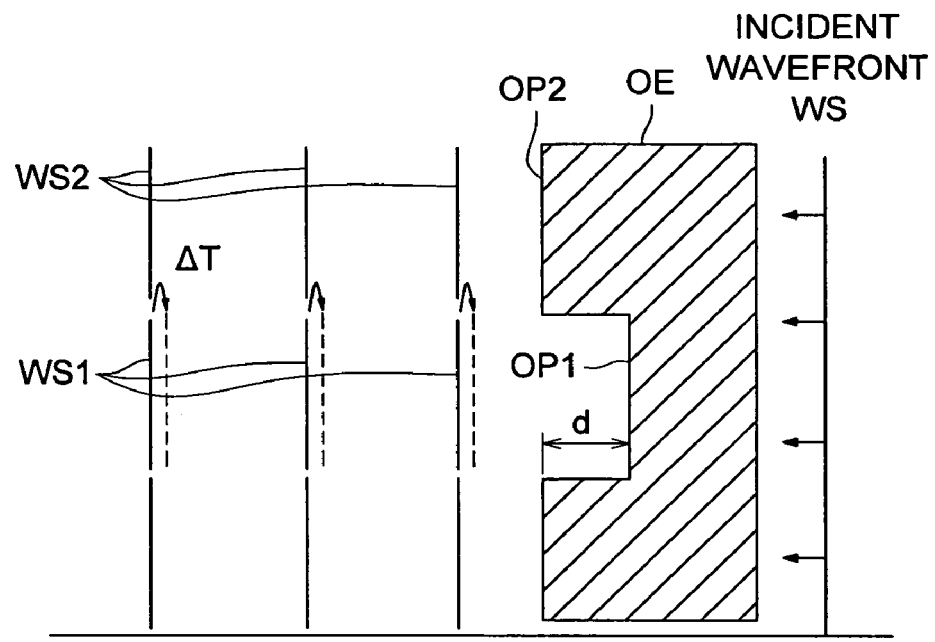
FIGS. 3(a) and 3(b) are views for explaining the principle of the structure according to the present invention.
Figure 3:
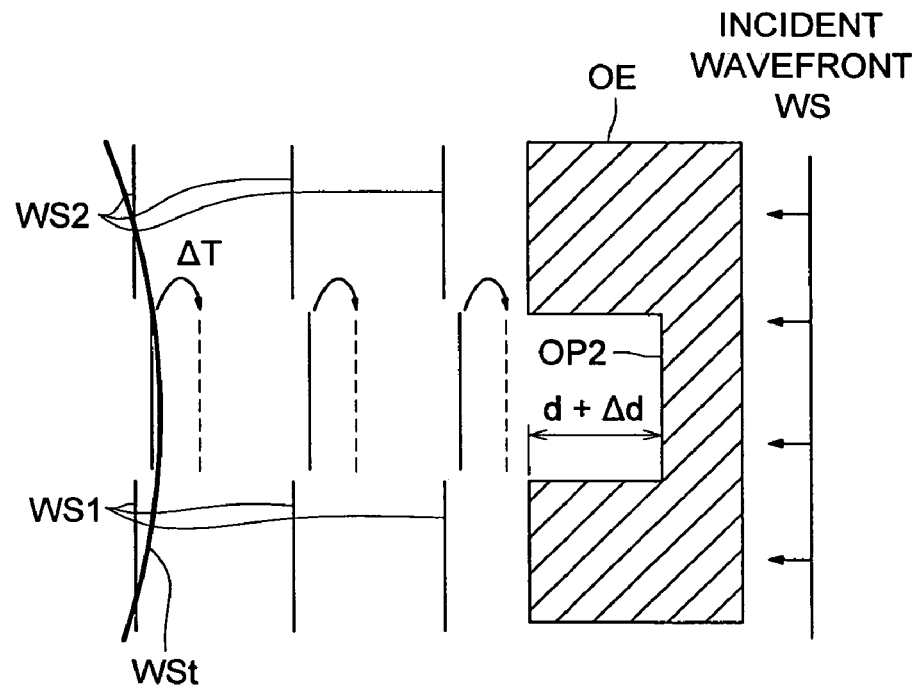

Referring to FIGS. 3(a)-4(b), the principle of the embodiment according to the present invention will be described. FIG. 3(a) is a view showing a condition of the wavefront for a structure in which an optimum step difference amount d along the optical axis is set, and FIG. 3(b) is a view showing a condition of the wavefront for a structure in which an non-optimum step difference amount (d+Δd) along the optical axis is set. As described above, the wavefront shape WS of the light passing through the first optical element OE can be maintained irrespective of the temperature change by making the absolute value of the variation of the focus position (refer to FIG. 1(a)) caused by the refractive index change of the first optical element OE due to the temperature change, and the variation of the focus position (refer to FIG. 1(b)) caused by the wavefront change due to the step difference of the first optical element OE due to the temperature change, almost equal.

As shown in FIGS. 3(a) and 3(b), there is provided the step difference amount d along the optical axis in which the wavefront shape WS of the light passing through the first optical element OE can be maintained irrespective of the temperature change, and the step difference amount in the optical axis direction is made large to (d+Δd). At that time, for example, the dislocation ΔT of the phase difference of the wavefront is increased when the temperature rises, as the result, there is a possibility that the aberration correction is excessive. Accordingly, the present inventors found the optimum range of the step difference amount d in the optical axis direction by the following method.

Figure 4:
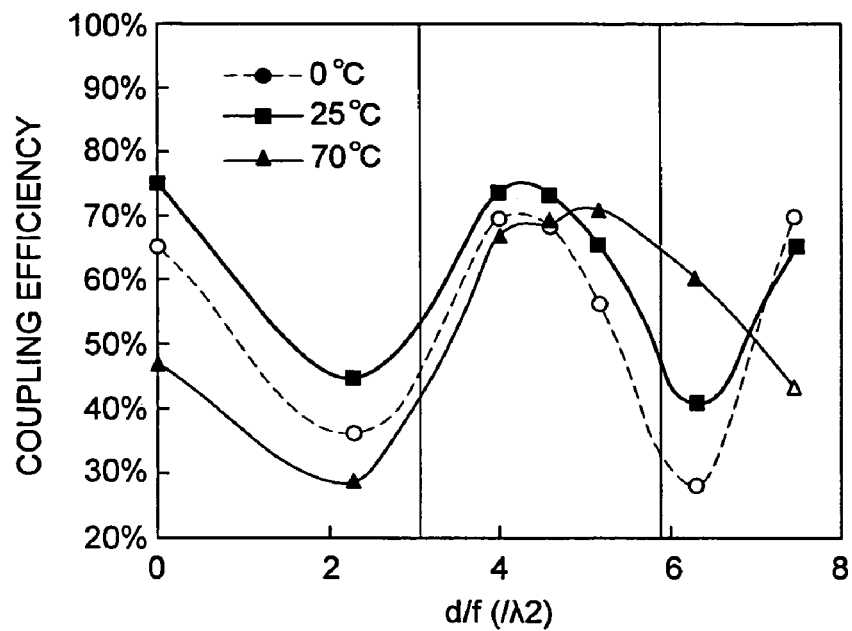
FIGS. 4(a) and 4(b) are views showing the relationship between a step difference amount d in the optical axis direction on the optical function surface into which the first optical element OE is divided, and the coupling efficiency.
Figure 4:
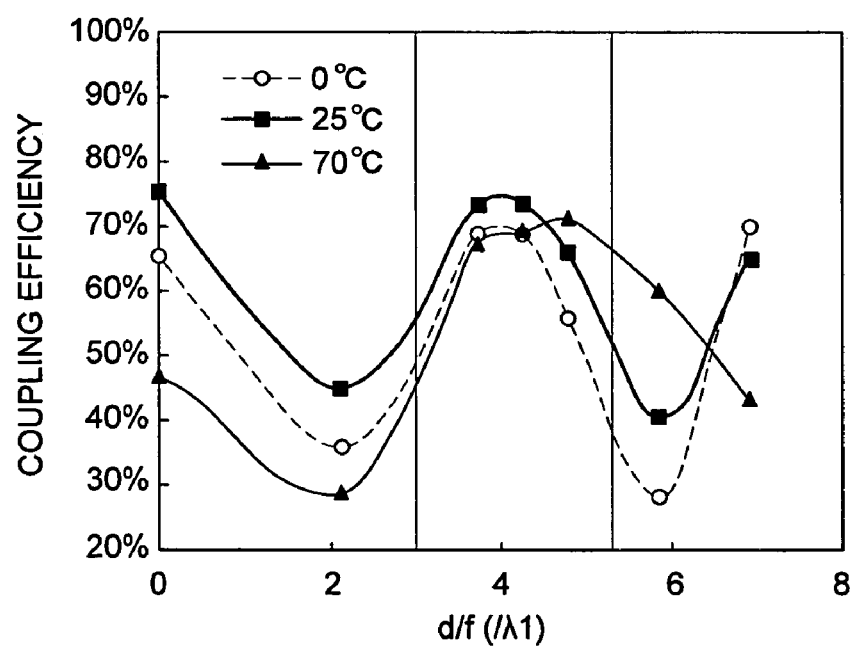

In FIG. 4.(a), the vertical axis is the coupling efficiency and the horizontal axis is (d/f)/λ2, where d is the step difference amount in the optical axis direction (refer to FIG. 2(a)) in the optical functional surface into which the first optical element OE is divided, f is a focal length of the first optical element OE and (d/f)/λ2 is a value that d/f is further divided by the wavelength λ2. As shown in FIG. 4(a), (d/f)/λ2 satisfying the expression (5) suppresses the lowering of the coupling efficiency to within 20% by even when the ambient temperature rises to 70° C. from the reference temperature 25° C.

Item 12 is the optical communication module of Item 11, the step difference amount d in the optical axis direction of the divided optical functional surface satisfies the following expression (6).

$$2.9[/mm] \times \lambda 1 \leq d/f \leq 5.4[/mm] \times \lambda 1 \tag{6}$$

In FIG. 4(b), the vertical axis is the coupling efficiency and the horizontal axis is (d/f)/λ1, where d is the step difference amount in the optical axis direction (refer to FIG. 2(a)) in the optical functional surface into which the first optical element OE is divided, f is a focal length of the first optical element OE and (d/f)/λ1 is a value that d/f is further divided by the wavelength λ1. As shown in FIG. 4(b), (d/f)/λ1 satisfying the expression (6) more suppresses the lowering of the coupling efficiency, even when the ambient temperature rises from the reference temperature 25° C. to 70° C.

Item 13 is the optical communication module of any one of Items 11-12, in which at least one of the divided optical functional surfaces is a ring-shaped zone whose center is placed on the optical axis.

The optical communication module of any one of Items 11-13 in which at least one of the borders of the divided optical functional surfaces may be, a polygon when they are observed along the optical axis direction.

The optical communication module of any one of Items 11-13 in which at least one of the borders of the divided optical functional surfaces may be oval when they are observed along the optical axis direction.

The optical communication module of any one of Items 11-13 in which the divided optical functional surfaces may be formed on the first optical surface.

Item 14 is the optical communication module of any one of Items 1-13 in which the first optical surface is divided into at least the first optical functional surface including the optical axis and the second optical functional surface surrounding the first optical functional surface and provided through a step difference. The step difference extends in a direction such that a place on the first optical element with the second optical functional surface has a lager thickness along the optical axis than a place on the first optical element with the first optical functional surface.

Item 15 is the optical communication module of any one of Items 1-14 in which the wavelength λ1 and the wavelength λ2 satisfy following expressions:

$$1480 \text{ nm} \leq \lambda 1 \leq 1500 \text{ nm}$$

$$1280 \text{ nm} \leq \lambda 2 \leq 1340 \text{ nm}.$$

Item 16 is the optical communication module of any one of Items 1-15, is further includes a second light-receiving element with a receiving surface in which a light flux with a wavelength λ3 emitted from an end surface of the optical fiber enters. The receiving surface of the second light-receiving element is different from receiving surface of the first light-receiving element. The diffractive structure generates a q-th order diffracted light flux with a larger light amount than any generated diffracted light flux with the other diffraction order when the light flux with the wavelength λ3 (λ1≠λ3 and λ2≠λ3) passes through the diffractive structure, where q is an integer satisfying m≠q. The first optical element converges the light flux with the wavelength λ3 emitted from the end surface of the optical fiber enters on the receiving surface of the second light-receiving element.

Item 17 is the optical communication module of Item 16 in which the wavelength λ1, the wavelength λ2, and the wavelength λ3 satisfy following expressions:

$$1480 \text{ nm} \leq \lambda 1 \leq 1500 \text{ nm}$$

$$1280 \text{ nm} \leq \lambda 2 \leq 1340 \text{ nm}$$

$$1530 \text{ nm} \leq \lambda 3 \leq 1570 \text{ nm}.$$

Item 18 is the optical communication module of any one of Items 1-17 in which the end surface of the optical fiber inclines to an axis of the optical fiber.

Item 19 is the optical communication module of any one of Items 1-17 in which the end surface of the optical fiber is perpendicular to an axis of the optical fiber.

Item 20 is the optical communication module of any one of Items 1-19 in which the diffractive structure generates a first order diffracted light flux with a larger light amount than any generated diffracted light flux with the other diffraction order when the light flux with the wavelength λ1 passes through the diffractive structure.

Item 21 is the optical communication module of any one of Items 1-20 in which the diffractive structure is an echelon type diffractive structure periodically formed along a predefined direction.

Item 22 is the optical communication module of any one of Items 1-21 in which the first optical element is formed of resin.

There is provided the cyclic olefin system and the "athermal resin" as the resin material appropriate for the objective optical element according to the present invention. "Athermal resin" is a resin material in which microparticles whose diameter is 30 nm or less and whose change ratio of the refractive index has a sign reverse to the change ratio of the refractive index caused by the temperature change of the resin of the base material, are dispersed. Generally, when microparticles are mixed in the transparent resin material, light is scattered and the transmission factor is lowered. So, it is difficult to use as the optical material. However, it becomes clear that the microparticles whose size is smaller than the wavelength of the transmitting light flux prevent the scattering effectively.

Hereupon, the refractive index of the resin material is lowered when the temperature rises, while the refractive index of the inorganic microparticles is increased when the temperature rises. Accordingly, it is also well known that combining these nature to affect to cancel out each other prevents the refractive index change. There is provided the objective optical unit having no temperature dependency of the refractive index, or very low temperature dependency by using the material such that the inorganic particles whose size is 30 nanometer or less, preferably is 20 nanometer or less, more preferably 10-15 nanometer, are dispersed in the resin as base material for the material of the objective optical unit according to the present invention.

For example, acryl resin in which microparticles of niobium oxide ($Nb_2O_5$) are dispersed is provided. The volume ratio of the resin material that represents the basic material is about 80% and that of niobium oxide is about 20%, and these are mixed uniformly. Though microparticles have a problem that they tend to condense, the necessary state of dispersion can be kept by a technology to disperse particles by giving electric charges to the surface of each particle.

It is preferable that microparticles are mixed and dispersed into the resin as a base material in line in the case of injection molding of optical elements. In other words, it is preferable that an objective optical unit is neither cooled nor solidified until it is molded, after its materials are mixed and dispersed, because the mixture is molded into an objective optical unit.

Incidentally, for controlling a rate of change of the refractive index for temperature, a volume ratio of acrylic resins to niobium oxide in the aforementioned temperature-affected characteristics adjustable material can be raised or lowered properly, and it is also possible to blend and disperse plural types of inorganic particles in a nanometer size.

Though a volume ratio of acrylic resins to niobium oxide is made to be 80:20, namely to be 4:1, in the example stated above, it is possible to adjust properly within a range from 90:10 (9:1) to 60:40 (3:2). It is not preferable when an amount of niobium oxide is less to be out of 9:1, because an effect of restraining temperature-affected changes becomes small. While, it is not also preferable when an amount of niobium oxide is more to be out of 3:2, because moldability of resins becomes problematic.

It is preferable that the microparticles are inorganic substances, and more preferable that the microparticles are oxides. Further, it is preferable that the state of oxidation is saturated, and the oxides are not oxidized any more.

It is preferable that the microparticles are inorganic substances because reaction between the inorganic substances and resin as a base material representing high molecular organic compound is restrained to be low, and deterioration caused by actual use such as irradiation of laser beam can be prevented because the microparticles are oxides. In particular, under the severe conditions such as high temperature and irradiation of a laser beam, oxidation of resin tends to be accelerated. However, microparticles of this inorganic oxide can prevent deterioration caused by oxidation.

Further, it is naturally possible to add antioxidants in resin material to prevent oxidation of resin caused by other factors.

Materials described in JP-A 2004-144951, JP-A 2004-144953, JP-A 2004-144954 are suitable for a preferable material to be base material.

Item 23 is the optical communication module of any one of Items 1-22 in which an optical surface having the first optical functional surface and the second optical functional surface comprises an optical path difference providing structure. A diffractive structure and NPS (Non-Periodic Phase Structure) is cited as an example of "the optical path difference providing structure".

Item 24 is an optical element for use in an optical communication module and for arranged between a first light-receiving element and a light-emitting element, and an optical fiber, for converging a light flux with a wavelength $\lambda 1$ emitted from an end surface of an optical fiber on a light-receiving surface of the first light-receiving element, and for converging a light flux with a wavelength $\lambda 2$ ($\lambda 1 \neq \lambda 2$) emitted from the light-emitting element. The optical element includes a first optical surface with a positive refractive power and a second optical surface having a diffractive structure. The diffractive structure generates a m-th order diffracted light flux with a larger light amount than any generated diffracted light flux with the other diffraction order when the light flux with the wavelength $\lambda 2$ passes through the diffractive structure, and generates a n-th order diffracted light flux with a larger light amount than any generated diffracted light flux with the other diffraction order when the light flux with the wavelength $\lambda 1$ passes through the diffractive structure, where m is an integer including 0, n is an integer, and m and n satisfy m$\neq$n. One of the first optical surface and the second optical surface is divided into a first optical functional surface including an optical axis and a second optical functional surface surrounding the first optical functional surface and arranged through a step difference extending along the optical axis.

Item 25 is the optical element of Item 24 in which the first optical surface is divided into at least the first optical functional surface including the optical axis and the second optical functional surface surrounding the first optical functional surface and provided through a step difference extending in a direction such that a place on the first optical element with the second optical functional surface has a lager thickness along the optical axis than a place on the first optical element with the first optical functional surface.

Item 26 is the optical element of Item 24 or 25 in which the wavelength $\lambda 1$ and the wavelength $\lambda 2$ satisfy following expressions:

$$1480 \text{ nm} \leq \lambda 1 \leq 1500 \text{ nm}$$

$$1280 \text{ nm} \leq \lambda 2 \leq 1340 \text{ nm}.$$

Item 27 is the optical element of any one of Items 24-26 in which the diffractive structure generates a q-th order diffracted light flux with a larger light amount than any generated diffracted light flux with the other diffraction order when the light flux with the wavelength $\lambda 3$ passes through the diffractive structure, where q is an integer satisfying m$\neq$q, $\lambda 1 \neq \lambda 3$, and $\lambda 2 \neq \lambda 3$, so as to converge the light flux with the wavelength $\lambda 3$ emitted from the end surface of the optical fiber enters on a receiving surface of a second light-receiving element which is different form the first light-receiving element.

Item 28 is the optical element of Items 27 in which the wavelength $\lambda 1$, the wavelength $\lambda 2$, and the wavelength $\lambda 3$ satisfy following expressions:

$$1480 \text{ nm} \leq \lambda 1 \leq 1500 \text{ nm}$$

$$1280 \text{ nm} \leq \lambda 2 \leq 1340 \text{ nm}$$

$$1530 \text{ nm} \leq \lambda 3 \leq 1570 \text{ nm}.$$

According to the present invention, the optical communication module which can enhance the coupling efficiency of the optical fiber, can be provided.

While the preferred embodiments of the present invention have been described using specific terms, such description is for illustrative purposes only, and it is to be understood that changes and variations may be made without departing from the sprit or scope of the appended claims.

EXAMPLES

First Embodiment

Referring to drawings, the first embodiment of the present invention will be described below. FIG. 5 is a schematic side view of the optical communication module according to the first embodiment. Hereupon, an Echelon type diffractive structure is exaggeratingly drawn rather than the existing one for easy understanding.

Hereupon, the first optical surface having the positive refractive power is provided on the light-emitting element and light-receiving element side, and the second optical surface having the diffraction surface is provided on the optical fiber side in the first optical element in the following Example. However, it is not limited to this, the first optical surface having the positive refractive power may be provided on the optical fiber side, and the second optical surface having the diffraction surface may also be provided on the light-receiving element and light-emitting element side. In the present specification, "the coupling efficiency" means a rate of an optical signal intensity transmitted in an optical fiber waveguide when the optical signal intensity of the semiconductor laser (light source) is defined to 100%.

In FIG. 5, the resin-made lens (the first optical member) 5 is arranged at the center of a cylindrical case 6. Further, hollow cylindrical holding member 3 is attached to the left end of the case 6 and the optical fiber 1 is inserted into the holding member 3. The optical fiber 1 connecting to the optical communication system can propagate an optical signal sent to and received from the other terminal device, and the end surface 1a perpendicular to its axis of the optical fiber emits the transmission light and receives the receiving light. Furthermore, the substrate 2 is attached to the right end of the case 6, and the light-receiving element 4 including a photodiode and the light-emitting unit 7 are provided on the inside surface of the substrate 2. A cover glass 9 is attached to the case 6 between the light-emitting unit 7 and the light-receiving element 4, and the lens 5. Herein, the cover glass 9 is mainly provided for the dust prevention. The light-emitting unit 7 is formed by a light-emitting element 7a as a semiconductor laser and the glass-made spherical lens (the second light-emitting element) 7b which are integrally assembled. The light-receiving element 4 and the light-emitting element 7a are structured so as to connect the electric signal in a transmittable manner to the outside terminal device (not shown) through a connector 8 connected to the substrate 2.

Figure 6A:
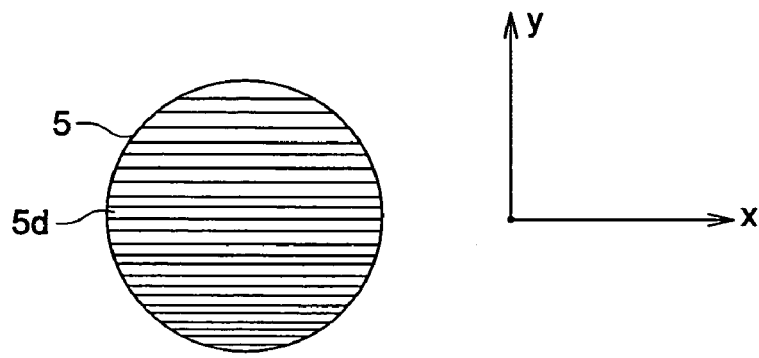
FIGS. 6(a)-6(c) are views showing the lens 5.
Figure 6B:
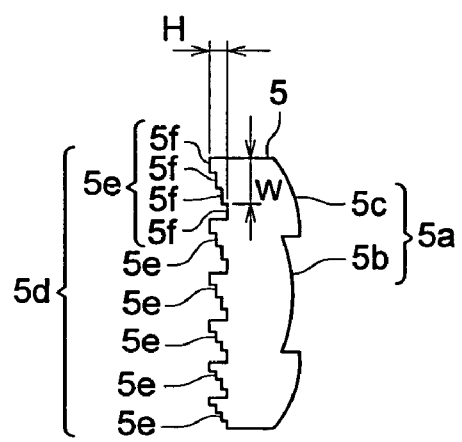
Figure 6C:
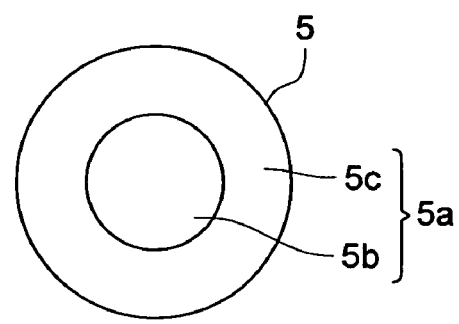

FIG. 6(a) is a view in which the lens 5 is viewed from the optical fiber 1 side. FIG. 6(b) is a view in which the lens 5 is viewed in the orthogonal direction to the optical axis. FIG. 6(c) is a view in which the lens 5 is viewed from the light-emitting unit 7 and the light-receiving element 4 side. As shown in FIG. 6(c), the lens 5 has an aspheric optical surface 5a (the second optical surface having the positive refractive power), and this optical surface 5a formed of the circular optical functional surface 5b which includes the optical axis, and the optical functional surface 5c which surrounds the optical functional surface 5b and shifted in the optical axis direction.

Furthermore, the lens 5 forms the Echelon type diffractive structure 5d on the optical surface (the first optical surface having the diffractive structure) on the optical fiber 1 side. The Echelon type diffractive structure 5d, as shown in FIG. 6(b), is formed of the step gratings 5e which extend in the horizontal direction on the optical surface and repeat periodically. The each step grating 5e has a step shape whose cross section along the optical axis has a predefined numbers of levels 5f. One step grating 5e, for example, has 4 levels and may have a whole width W of 38 μm and a whole height H of 15 μm, when the wavelength of the laser light emitted from the light-emitting element 7a is $\lambda 2 = 1.31$ μm, and the wavelength of the light flux which is transmitted from the optical fiber 1 and emitted from the end surface 1a is $\lambda 1 = 1.49$ μm.

When the optical communication module shown in FIGS. 5 and 6(a)-6(c) is applied to the optical bidirectional optical communication apparatus for transmitting and receiving the optical signal, for example, the laser light with the wavelength $\lambda 2 = 1.31$ μm is modulated based on a predetermined signal, is emitted from the light-emitting element 7a, and enters on the lens 5 through the lens 7b. At this time, as shown by the solid line, the laser light straightly travels as the 0th-order diffracted light flux because the Echelon type diffractive structure 5d is a structure in which it does not provide the diffraction effect for the wavelength $\lambda 2 = 1.31$ μm (that is, the light amount of the 0th-order diffraction light is max.). The 0th-order diffracted light flux enters on the end surface 1a of the optical fiber 1, and is sent to the outside terminal device through the optical fiber 1.

On the other hand, for example, the light flux whose wavelength $\lambda 1 = 1.49$ μm is sent from the optical fiber 1, is emitted from the end surface 1a, and enters on the optical surface of the lens 5 as a divergent light flux. At this time, the first order diffracted light flux generated by the diffractive structure 5d is angled to the incident light as shown by a dotted line because the Echelon type diffractive structure provides a diffractive effect for the incident light flux with the wavelength $\lambda 1 = 1.49$ μm and generates the first order diffracted light flux with the maximum light amount. Further, the incident divergent light flux is converted into the convergent light flux because the optical surface 5a is aspheric surface. In this manner, the divergent light flux of the wavelength $\lambda 1 = 1.49$ μm emitted from the end surface 1a of the optical fiber 1 is formed into an image by the lens 5 on the light receiving surface of the light-receiving element 4, and is converted into electric signal. Based on such an electric signal, the transmitted information can be obtained. Hereupon, the optical communication module is housed in the case 6 as a whole, and used in the light-shielding condition.

According to the present embodiment, the temperature correction can be conducted as described above and the spherical aberration by a spherical lens 7b can be suppressed because the optical functional surface shifted in the optical axis is provided on the refractive surface of the lens 5. Hereupon, the optical functional surface may also be formed by being superimposed on the diffractive structure 5d.

Second Embodiment

Figure 7:
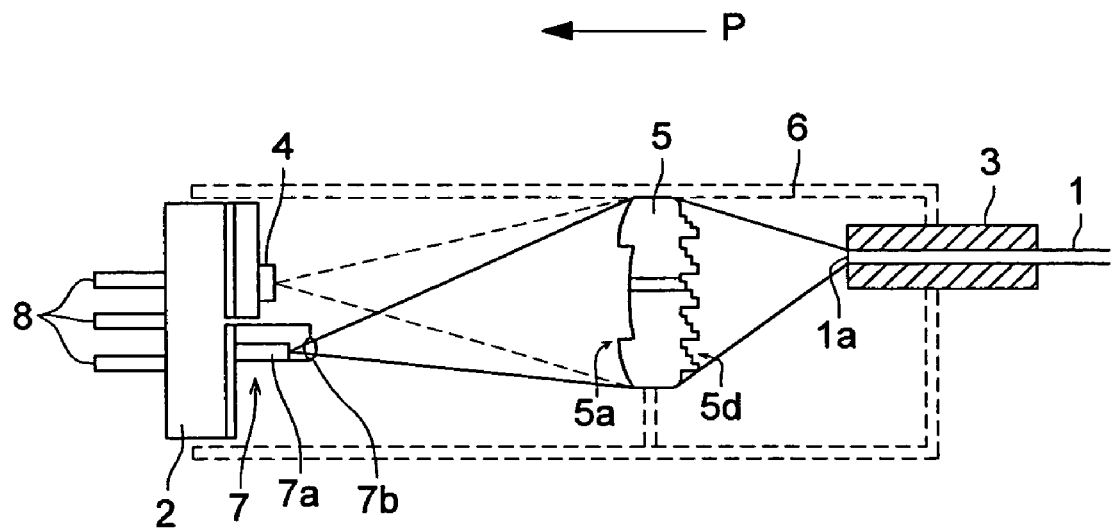
FIG. 7 is an outline sectional view of an optical communication module according to the second embodiment.

FIG. 7 is a schematic sectional view of the optical communication module according to the second embodiment. Hereupon, an Echelon type diffractive structure is exaggeratingly drawn rather than the existing one for easy understanding.

In FIG. 7, the resin-made lens (the first optical member) 5 is arranged at the center of a cylindrical case 6. Further, hollow cylindrical holding member 3 is attached to the right end of the case 6 and the optical fiber 1 is inserted into the holding-member 3. The optical fiber 1 connecting to the optical communication system can propagate an optical signal sent to and received from the other terminal device, and the end surface 1a perpendicular to its axis of the optical fiber emits the transmission light and receives the receiving light. Furthermore, the substrate 2 is attached to the left end of the case 6, and the light-receiving element 4 including a photodiode and the light-emitting unit 7 are provided on the inside surface of the substrate 2. The light-emitting unit 7 is formed by a light-emitting element 7a as a semiconductor laser and the glass-made spherical lens (the second light-emitting element) 7b which are integrally assembled. The light-receiving element 4 and the light-emitting element 7a are structured so as to connect the electric signal in a transmittable manner to the outside terminal device (not shown) through a connector 8 connected to the substrate 2.

The lens 5 has a similar shape to the embodiment shown in FIGS. 5 and 6(a)-6(c), but the optical surface 5a (the second optical surface having the positive refractive power) is divided into three optical functional surfaces through step differences extending along the optical axis.

When the optical communication module in FIG. 7 is applied to the optical bidirectional optical communication apparatus for transmitting and receiving the optical signal, for example, the laser light with the wavelength $\lambda 2=1.31$ µm is modulated based on a predetermined signal, is emitted from the light-emitting element 7a, and enters on the lens 5 through the lens 7b. At this time, as shown by the solid line, the laser light straightly travels as the 0th-order diffracted light flux because the Echelon type diffractive structure 5d is a structure in which it does not provide the diffraction effect for the wavelength $\lambda 2=1.31$ µm (that is, the light amount of the 0th-order diffraction light is max.). The 0th-order diffracted light flux enters on the end surface 1a of the optical fiber 1, is sent to the outside terminal device through the optical fiber 1.

On the other hand, for example, the light flux with wavelength $\lambda 1=1.49$ µm is sent from the optical fiber 1, is emitted from the end surface 1a, and enters on the optical surface of the lens 5 as a divergent light flux. At this time, the first order diffracted light flux generated by the diffractive structure 5d is angled to the incident light as shown by a dotted line because the Echelon type diffractive structure provides a diffractive effect for the incident light flux with the wavelength $\lambda 1=1.49$ µm and generates the first order diffracted light flux with the maximum light amount. Further, the incident divergent light flux is converted into the convergent light flux because the optical surface 5a is aspheric surface. The light flux emitted from the lens 5 travels along (or parallel to) the optical axis, is formed into an image on the light receiving surface of the light-receiving element 4, and is converted into electric signal. The transmitted information can be obtained based on such an electric signal. Hereupon, the optical communication module is housed in the case 6 as a whole, and used in the light-shielding condition.

According to the present embodiment, the temperature correction can be conducted as described above and the spherical aberration by a spherical lens 7b can be-suppressed because the optical functional surface shifted in the optical axis is provided on the refractive surface of the lens 5. Hereupon, the optical functional surface may also be formed by being superimposed on the diffractive structure 5d.

Figure 8:
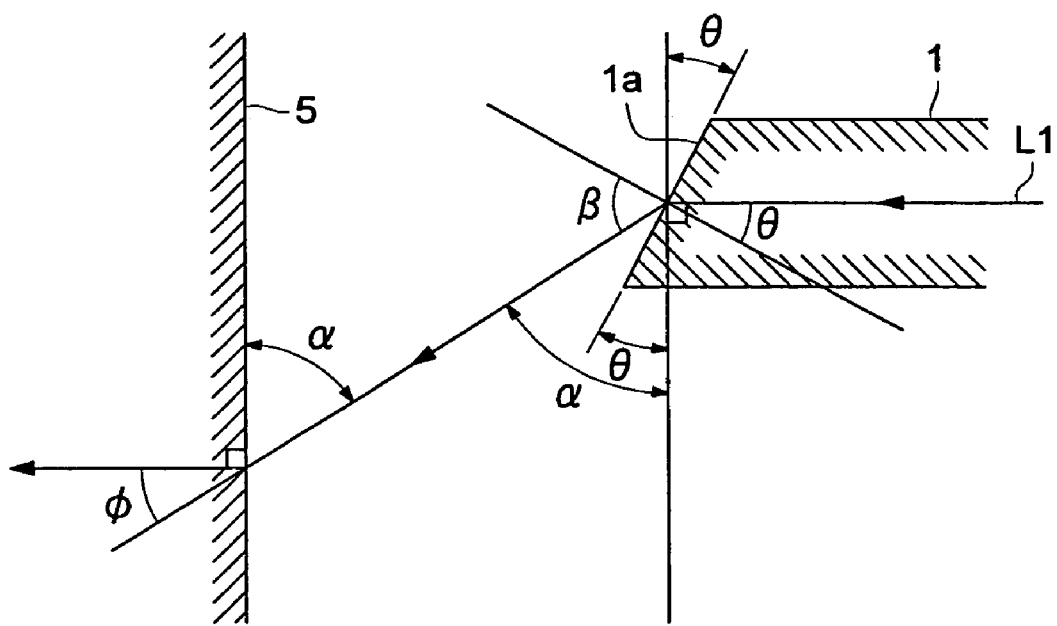
FIG. 8 is a schematic view showing a positional relationship between the optical fiber 1 and the lens 5.

FIG. 8 is a schematic view showing the position relationship between the optical fiber 1 shown in FIG. 7 and the lens 5, however, the diffractive structure of the lens 5 is omitted. Herein, the case where the axis of the optical fiber 1 is parallel to the optical axis of the lens 5, will be considered. Initially, the end surface angle (angle in which the end surface 1a forms to the axis line L1 of the optical fiber 1) is made $\theta$, the diffraction angle in the diffractive structure is made $\phi$, and the inclination angle of the projection light to the vertical line is made $\alpha$. Herein, the following expression is realized.

$$\alpha + \phi = 90° \tag{11}$$

When the refractive index of the material of the optical fiber is n, the refractive index of the air is 1, and the incident angle (=inclination angle) when the light beam entering horizontally is $\theta$, and the projection angle is $\beta$, the following expression is realized by the Snell's raw.

$$n \cdot \sin \theta = \sin \beta \tag{12}$$

Furthermore, the following expression is realized from the geometrical relationship.

$$\alpha - \theta + \beta = 90° \tag{13}$$

Expressions (11) and (13) provide $\beta = \theta + \phi$. So when this is substituted in the expression (12), the following expression can be obtained.

$$n \cdot \sin \theta = \sin (\theta + \phi) = \sin \theta \cos \phi + \sin \phi \cos \theta$$

Furthermore, both sides of the expression are divided by $\cos \theta$ and the following expression is obtained.

$$n \cdot \tan \theta = \tan \theta \cos \phi + \sin \phi$$

The above expression is deformed and the following expression is obtained.

$$\theta = \tan^{-1}\{\sin \phi / (n - \cos \phi)\} \tag{14}$$

The expression (14) means that the end surface angle $\theta$ can be expressed by using the diffraction angle $\phi$ and the refractive index n as its parameters. That is, the end surface angle $\theta$ can be found corresponding to the decided diffraction angle $\phi$, when the material of the optical fiber 1 is already decided the first-order diffracted light flux is generated in the diffractive structure 5d. The optical fiber having such an end surface angle is easily assembled because the axis of the optical fiber 1 and the optical axis of the lens 5 can be made to parallel position.

Hereupon, when the end surface angle $\theta$ is set to the optimum value to satisfy the expression (14), the maximum light transmission factor can be obtained. However, it is not necessary to exactly satisfy the expression (14).

Third Embodiment

An example that a light flux emitted from the optical fiber has a wavelength with $\lambda 1$ in the first embodiment described above, however, the structure according to the present invention is not limited to the structure for the light flux emitted from the optical fiber has a wavelength with $\lambda 1$ but can be applied to a device for that has multiple-wavelengths.

For example, an optical communication module for three wavelengths in which the light fluxes emitted from the optical fiber has two wavelengths of $\lambda 1$ and $\lambda 3$ or an optical communication module for four wavelengths in which the light fluxes emitted from the optical fiber has three wavelengths of $\lambda 1$, $\lambda 3$ and $\lambda 4$ can be provided.

Figure 15:
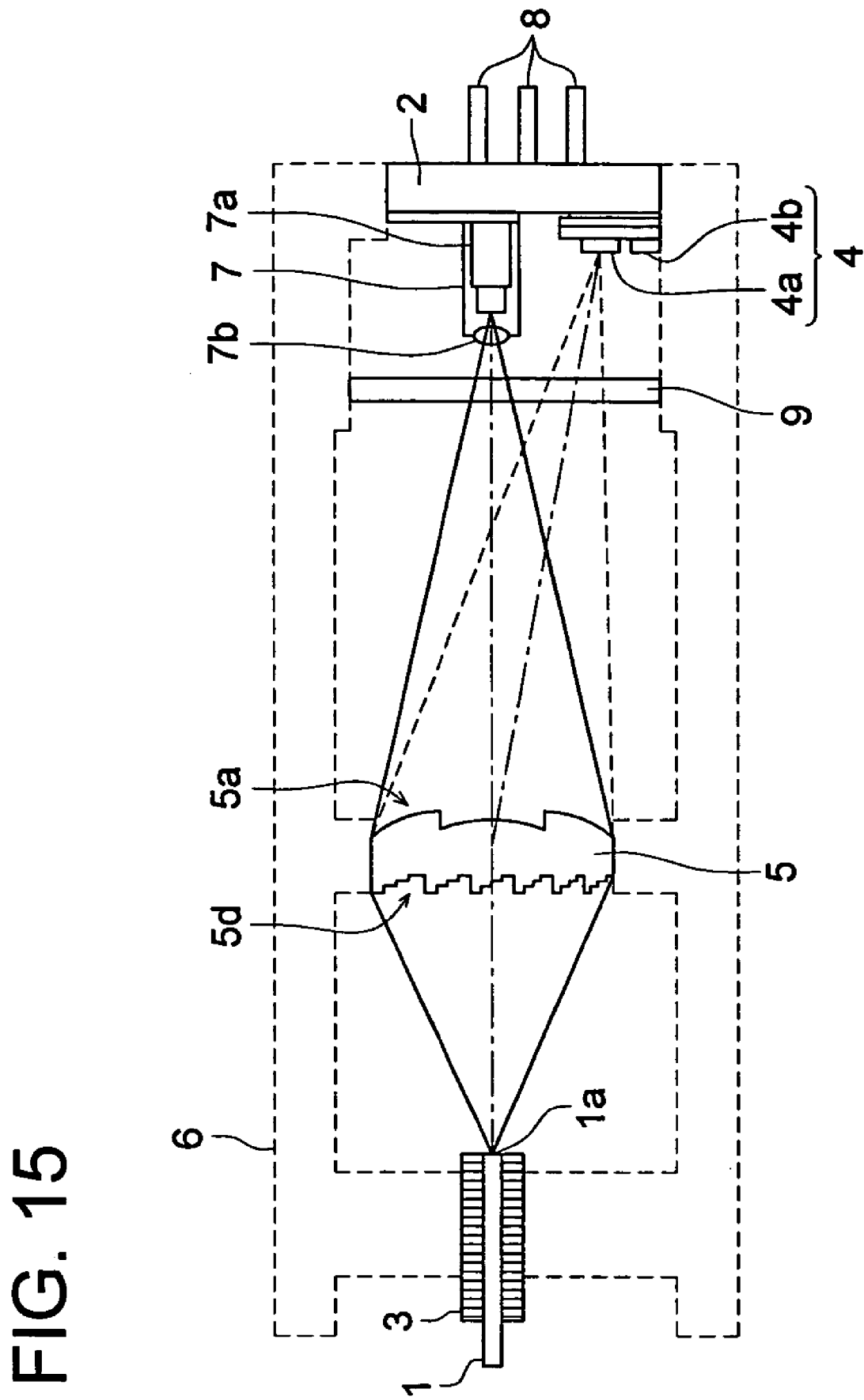
FIG. 15 is an outline sectional view of the optical communication module according to the third embodiment.

FIG. 15 shows an-optical communication module 6 for three wavelengths and is structured in the same manner to the optical communication module 5 in FIG. 5. Herein, as shown in FIG. 15, light-receiving element 4a and 4b for receiving a light fluxes with wavelength $\lambda 1$ and $\lambda 3$ respectively are arranged inside of the substrate 2 in the third embodiment.

The lens 5 has a similar shape to the embodiment shown in FIGS. 5 and 6(a)-6(c).

Figure 18:
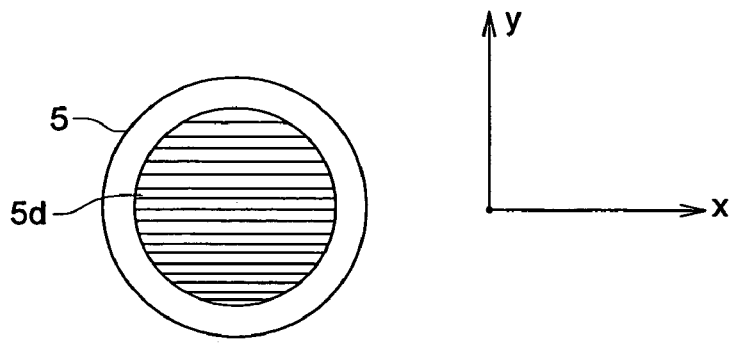
FIGS. 18(*a*)-18(*c*) are outline sectional views of the optical communication module according to the third embodiment.
Figure 18:
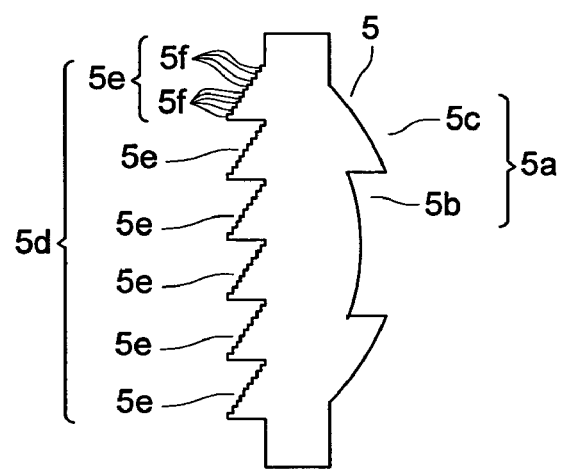
Figure 18:
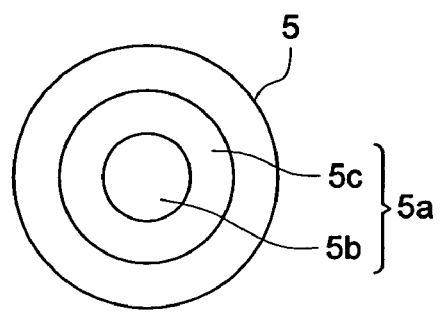

FIG. 18(a) is a view in which the lens 5 is viewed from the optical fiber 1 side. FIG. 18(b) is a view in which the lens 5 is viewed in the orthogonal direction to the optical axis. FIG. 18(c) is a view in which the lens 5 is viewed from the light-emitting unit 7 and the light-receiving element 4 side. As shown in FIG. 18(c), the lens 5 has an aspheric optical surface 5a (the second optical surface having the positive refractive power), and this optical surface 5a is formed of the circular optical functional surface 5b which includes the optical axis, and the optical functional surface 5c which surrounds the optical functional surface 5b and shifted in the optical axis direction.

Furthermore, the lens 5 forms the Echelon type diffractive structure 5d on the optical surface (the first optical surface having the diffractive structure) on the optical fiber 1 side. The Echelon type diffractive structure 5d, as shown in FIG. 18(b), is formed of the step gratings 5e which extend in the horizontal direction on the optical surface and repeat periodically. Each step grating 5e has a step shape whose cross section along the optical axis has a predefined numbers of levels 5f. As shown in FIG. 18(b), one step grating 5e has 9 levels and, for example, it may have a whole width W of 38 μm and a whole height H of 39 μm, when the wavelength of the laser light emitted from the light-emitting element 7a is λ2=1.31 μm, and the wavelengths of the light fluxes which are transmitted from the optical fiber 1 and emitted from the end surface 1a are λ1=1.49 μm and λ3=1.55 μm.

Alternatively, one step grating 5e has 11 levels and, for example, it may have a whole width W of 38 μm and a whole height H of 25 μm, when the wavelength of the laser light emitted from the light-emitting element 7a is λ2=1.31 μm, and the wavelengths of the light fluxes which are transmitted from the optical fiber 1 and emitted from the end surface 1a are λ1=1.49 μm and λ3=1.55 μm.

When the optical communication module in FIG. 15 is applied to the optical bidirectional optical communication apparatus for transmitting and receiving the optical signal, for example, the laser light with the wavelength λ2=1.31 μm is modulated based on a predetermined signal, is emitted from the light-emitting element 7a, and enters on the lens 5 through the lens 7b. At this time, as shown by the solid line, the laser light straightly travels as the 0th-order diffracted light flux because the Echelon type diffractive structure 5d is a structure in which it does not provide the diffraction effect for the wavelength λ2=1.31 μm (that is, the light amount of the 0th-order diffraction light is max.). The 0th-order diffracted light flux enters on the end surface 1a of the optical fiber 1, and is sent to the outside terminal device through the optical fiber 1.

On the other hand, for example, the light fluxes with wavelengths λ1=1.49 μm and λ3=1.55 μm are sent from the optical fiber 1, are emitted from the end surface 1a, and enters on the optical surface of the lens 5 as a divergent light flux. At this time, the diffracted light fluxes generated by the diffractive structure 5d are angled to the incident light as shown by a dotted line because the Echelon type diffractive structure provides a diffractive effect for the incident light fluxes with the wavelength λ1=1.49 μm and λ3=1.55 μm and generates the diffracted light fluxes with different diffraction orders and with the maximum light amount corresponding to the wavelengths. Further, the incident divergent light fluxes are converted into the convergent light fluxes because the optical surface 5a is aspheric surface. The light fluxes emitted from the lens 5 are formed into images by the lens 5 on the light receiving surfaces of the light-receiving elements 4 and 4', and are converted into electric signal. Based on such an electric signal, the transmitted information can be obtained. Hereupon, the optical communication module is housed in the case 6 as a whole, and used in the light-shielding condition.

Figure 16:
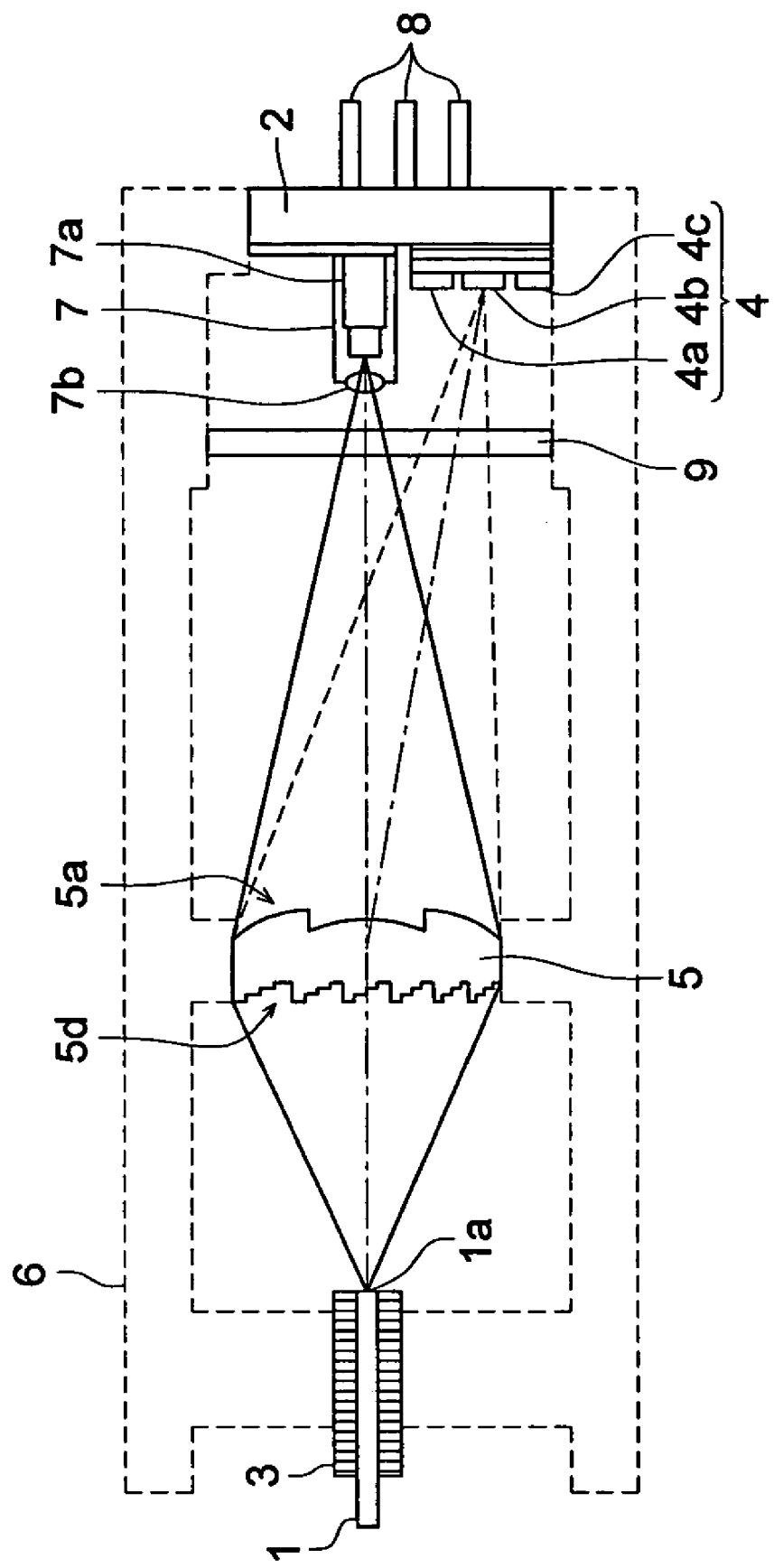
FIG. 16 is an outline sectional view of the optical communication module according to the third embodiment.

Similarly, an optical communication module 6 for the four wavelengths in FIG. 16 can have light-receiving elements 4a, 4b and 4c arranged in a direction perpendicular to the optical axis for receiving the light fluxes with three wavelengths of λ1, λ3, and λ4 respectively when the light fluxes from the optical fiber have three wavelengths of λ1, λ3, and λ4.

One step grating 5e has 13 levels and, for example, it may have a whole width W of 38 μm and a whole height H of 58 μm, when the wavelength of the laser light emitted from the light-emitting element 7a is λ2=1.31 λm, and the wavelengths of the light fluxes which are transmitted from the optical fiber 1 and emitted from the end surface 1a are λ1=1.49 μm, λ3=1.55 μm and λ4=1.61 μm.

When the optical communication module in FIG. 16 is applied to the optical bidirectional optical communication apparatus for transmitting and receiving the optical signal, for example, the laser light with the wavelength λ2=1.31 μm is modulated based on a predetermined signal, is emitted from the light-emitting element 7a, and enters on the lens 5 through the lens 7b. At this time, as shown by the solid. line, the laser light straightly travels as the 0th-order diffracted light flux because the Echelon type diffractive structure 5d is a structure in which it does not provide the diffraction effect for the wavelength λ2=1.31 μm (that is, the light amount of the 0th-order diffraction light is max.). The 0th-order diffracted light flux enters on the end surface 1a of the optical fiber 1, is sent to the outside terminal device through the optical fiber 1.

On the other hand, for example, the light fluxes with wavelengths λ1=1.49 μm, λ3=1.55 μm, and λ4=1.61 μm are sent from the optical fiber 1, are emitted from the end surface 1a, and enter on the optical surface of the lens 5 as a divergent light fluxes. At this time, the diffracted light fluxes generated by the diffractive structure 5d are angled to the incident light fluxes as shown by a dotted line because the Echelon type diffractive structure provides a diffractive effect for the incident light fluxes with the wavelength λ1=1.49 μm, λ3=1.55 μm, and λ4=1.61 μm and generates the diffracted light fluxes with different diffraction orders and with the maximum light amount corresponding to the wavelengths. Further, the incident divergent light fluxes are converted into the convergent light fluxes because the optical surface 5a is aspheric surface. The light fluxes emitted from the lens 5 are formed into images on the light receiving surfaces of the light-receiving elements 4a, 4b, and 4c respectively and are converted into electric signal. Based on such an electric signal, the transmitted information can be obtained. Hereupon, the optical communication module is housed in the case 6 as a whole, and used in the light-shielding condition.

According to the present embodiment, the temperature correction can be conducted as described above and the spherical aberration by a spherical lens 7b can be suppressed because the optical functional surface shifted in the optical axis is provided on the refractive surface of the lens 5. Hereupon, the optical functional surface may also be formed by being superimposed on the diffractive structure 5d.

Fourth Embodiment

Figure 17:
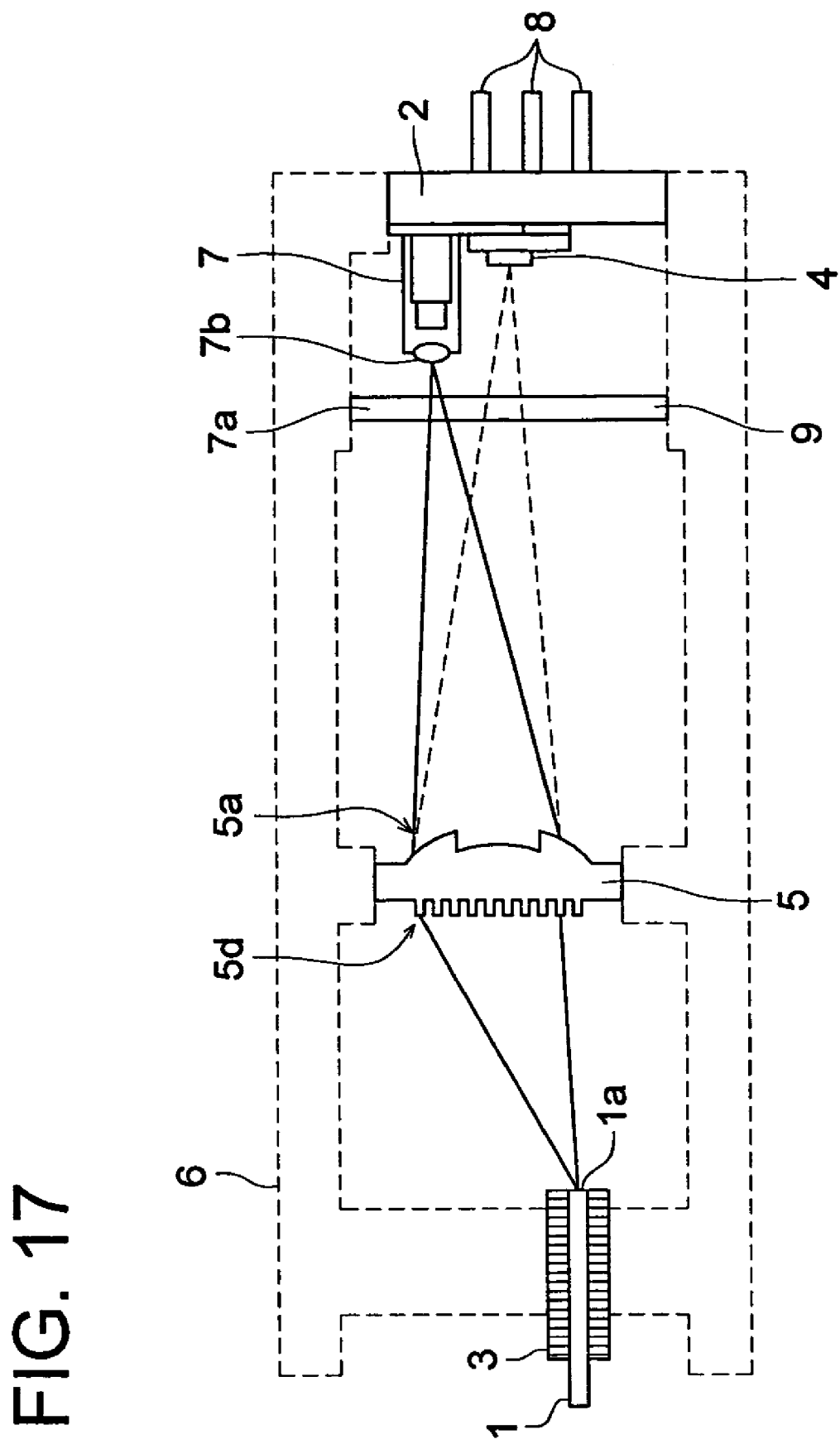
FIG. 17 is an outline sectional view of the optical communication module according to the fourth embodiment.

FIG. 17 is a schematic side view of the optical communication module according to the fourth embodiment. Hereupon, an Echelon type diffractive structure is exaggeratingly drawn rather than the existing one for easy understanding.

In FIG. 17, the resin-made lens (the first optical member) 5 is arranged at the center of a cylindrical case 6. Further, hollow cylindrical holding member 3 is attached to the left end of the case 6 and the optical fiber 1 is inserted into the holding member 3. The optical fiber 1 connecting to the optical communication system can propagate an optical signal sent to and received from the other terminal device, and the end surface 1a perpendicular to its axis of the optical fiber emits the transmission light and receives the receiving light. Furthermore, the substrate 2 is attached to the right end of the case 6, and the light-receiving element 4 including a photodiode and the light-emitting unit 7 are provided on the inside surface of the substrate 2. A cover glass 9 is attached to the case 6 Between the light-emitting unit 7 and the light-receiving element 4, and the lens 5. Herein, the cover glass 9 is mainly attached for the dust prevention. The light emitting unit 7 is formed by a light-emitting element 7a as a semiconductor laser and the glass-made spherical lens (the second light-emitting element) 7b which are integrally assembled. The light-receiving element 4 and the light-emitting element 7a are structured so as to connect the electric signal in a transmittable manner to the outside terminal device (not shown) through a connector 8 connected to the substrate 2.

Figure 19:
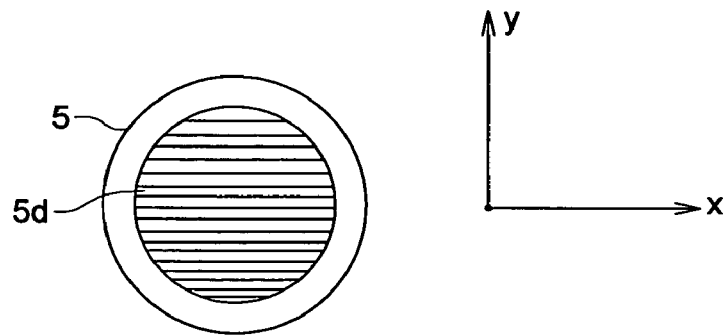
FIGS. 19(*a*)-19(*c*) are outline sectional views of the optical communication module according to the fourth embodiment.
Figure 19:
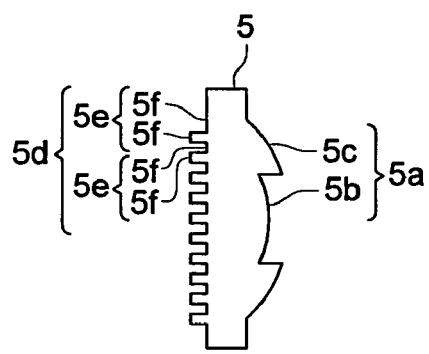
Figure 19:
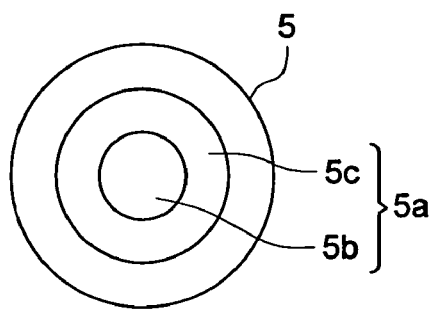

FIG. 19(*a*) is a view in which the lens 5 is viewed from the optical fiber 1 side. FIG. 19(*b*) is a view in which the lens 5 is viewed in the orthogonal direction to the optical axis. FIG. 19(*c*) is a view in which the lens 5 is viewed from the light-emitting unit 7 and the light-receiving element 4 side. As shown in FIG. 19(*c*), the lens 5 has an aspheric optical surface 5a (the second optical surface having the positive refractive power), and this optical surface 5a formed of the circular optical functional surface 5b which includes the optical axis, and the optical functional surface 5c which surrounds the optical functional surface 5b and shifted in the optical axis direction.

Furthermore, the lens 5 forms the Echelon type diffractive structure 5d on the optical surface (the first optical surface having the diffractive structure) on the optical fiber 1 side. The Echelon type diffractive structure 5d, so-called "2 steps Echelon structure", is formed of the step gratings 5e which extends in the horizontal direction on the optical surface and repeats periodically as shown in FIG. 19(*b*). One step grating 5e, for example, has 2 levels and may have a whole width W of 40 μm and a whole height H of 10 μm, when the wavelength of the laser light emitted from the light-emitting element 7a is λ2=1.31 μm, and the wavelength of the light flux which is transmitted from the optical fiber 1 and emitted from the end surface 1a is λ1=1.49 μm.

When the optical communication module shown in FIGS. 17 and 19(*a*)-19(*c*) is applied to the optical bidirectional optical communication apparatus for transmitting and receiving the optical signal, for example, the laser light with the wavelength λ2=1.31 μm is modulated based on a predetermined signal, is emitted from the light-emitting element 7a, and enters on the lens 5 through the lens 7b. At this time, as shown by the solid line, the laser light straightly travels as the 0th-order diffracted light flux because the Echelon type diffractive structure 5d is a structure in which it does not provide the diffraction effect for the wavelength λ2=1.31 μm (that is, the light amount of the 0th-order diffraction light is max). The 0th-order diffracted light flux enters on the end surface 1a of the optical fiber 1, and is sent to the outside terminal device through the optical fiber 1.

On the one hand, for example, the light flux whose wavelength λ1=1.49 μm is sent from the optical fiber 1, is emitted from the end surface 1a, and enters on the optical surface of the lens 5 as a divergent light flux. At this time, the first order diffracted light flux generated by the diffractive structure 5d is angled to the incident light as shown by a dotted line because the Echelon type diffractive structure provides a diffractive effect for the incident light flux with the wavelength λ1=1.49 μm and generates the first order diffracted light flux with the maximum light amount. Further, the incident divergent light flux is converted into the convergent light flux because the optical surface 5a is aspheric surface. In this manner, the divergent light flux of the wavelength λ1=1.49 μm emitted from the end surface 1a of the optical fiber 1 is formed into an image by the lens 5 on the light receiving surface of the light-receiving element 4, and is converted into electric signal. Based on such an electric signal, the transmitted information can be obtained. Hereupon, the optical communication module is housed in the case 6 as a whole, and used in the light-shielding condition.

According to the present embodiment, the temperature correction can be conducted as described above and the spherical aberration by a spherical lens 7b can be suppressed because the optical functional surface shifted in the optical axis is provided on the refractive surface of the lens 5. Hereupon, the optical functional surface may also be formed by being superimposed on the diffractive structure 5d.

Example 1

An Example of the first optical element which can be used for the first embodiment will be described below. Hereupon, the optical surface of the first optical element OE is formed into an aspheric surface which is axially. symmetrical around the optical axis, and provided by respectively substituting the coefficients shown in the Table into the Math-1.

$$Z(h) = \frac{h^2/r}{1+\sqrt{1-(1+\kappa)(h/r)^2}} + \sum_{i=0} A_{2i}h^{2i} \quad \text{[Math-1]}$$

Where, Z(h) is an aspheric surface shape, which is the distance in the direction along the optical axis from the surface apex of the aspheric surface, in which the progressing direction of the light beam is positive, h is a height in the direction perpendicular to the optical axis and satisfies h=$(x^2+y^2)^{1/2}$ herein, x and y respectively express the distance from the optical axis, and are defined that they are taken in the direction orthogonal to each other in the surface perpendicular to the optical axis, as shown in FIG. 6(*a*), r is a radius of curvature,
k is a conic constant,
A4, A6, A8, and A10 are aspheric surface coefficients,
A0 is an offset amount of the aspheric surface.

Further, the optical path difference provided to the incident light flux by the diffractive structure of the first optical element OE is expressed by the following optical path difference function $\phi_b$ (mm) in the present example.

$$\phi_b = \lambda/\lambda_B \times n \sum_{j=1} c_j y^j \quad \text{[Math-2]}$$

Where, $\phi_b$ is an optical path difference function,
n is a diffraction order of the diffracted light flux having the maximum diffraction light amount in the diffraction light fluxes generated in the diffractive structure,
λ is a wavelength of the light flux incident on the diffractive structure,
$\lambda_B$ is a blaze wavelength, which is manufactured wavelength,
y is a distance from the optical axis,
$C_j$ is a coefficient the optical path difference function.

Figure 9:
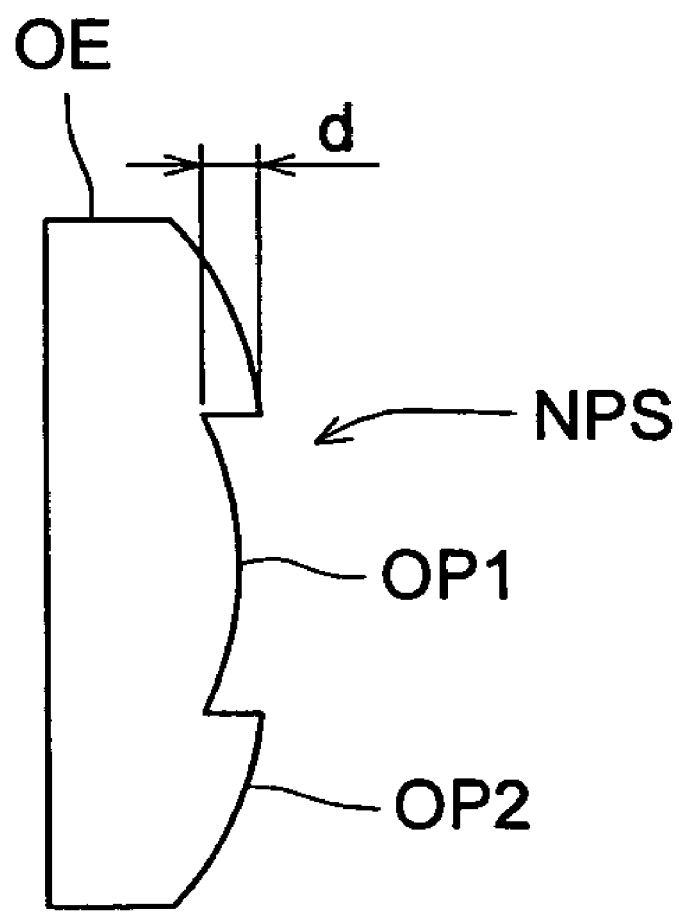
FIG. 9 is a sectional view of the first optical element OE according to the Example 1.

FIG. 9 is a sectional view of the first optical surface OE according to Example 1. Table 1 shows the lens data of Example 1. The first optical element OE forms the phase structure (which is abridged as NPS) with 2 ring-shaped zones OP1 and OP2 on the optical surface as the optical functional surfaces. The depth d along the optical axis of the lowest ring-shaped zone OP1 against the outermost ring-shaped zone OP2 (a step difference amount along the optical axis) is 0.02249 mm. The step difference does not change a light converging property of the first optical element OE for the wavelength λ1 because there is provided the step difference with a depth d along the optical axis corresponding to an optical path difference of 8×λ1 (nm) to the light flux with the wavelength λ1 passing through the 2-2th surface (OP2) compared to the light flux with the wavelength λ1 passing through the 2-1th surface (OP1) in the downward system. On the other hand, the step difference with a depth d along the optical axis corresponds to an optical path difference of almost 9×λ2 (nm) to the light flux with the wavelength λ2 passing through the 7-2th surface (OP2) compared to the light flux with the wavelength λ1 passing through the 7-1th surface (OP1) in the upward system. At that time, the step difference also does not change a light converging property of the first optical element OE for the wavelength λ2 on the reference temperature.

Herein, the phase structure NPS is a structure having the temperature correction function. As shown in Table 1, the structure provided with the phase structure NPS suppresses the lowering of the upward coupling efficiency from 28% to 3% when the temperature rises from the reference temperature 25° C. to 70° C., as compared to the structure without NPS. When the temperature rises from the reference temperature 25° C. to 70° C., the structure without NPS provides the coupling efficiency which is 60% to the coupling efficiency of the structure on the reference temperature, however, the structure with NPS provides the coupling efficiency which is about 90% to the coupling efficiency of the structure on the reference temperature. The structure provided with the phase structure NPS suppresses the lowering of the downward coupling efficiency from 6% to 4% when the temperature rises from the reference temperature 25° C. to 70° C., as compared to the structure without NPS. As it can be shown, the temperature property of the optical communication module in upward and downward can be respectively improved. Hereupon, in Example 1, the focal length f of the first optical element=3.53 mm.

Further, the downward coupling efficiency is estimated by using the rate of the φ40 μm encircled energy (that is, the light amount entering on the photodiode with φ40 μm).

TABLE 1

|  | Upward | Downward |
|---|---|---|
| Reference wavelength (nm) | 1310 | 1490 |
| Image surface side numerical aperture | 0.428 | 0.10 |

Upward system

| Surface No. | Curvature radius | Thickness | n(1.31 μm) | vd | note |
|---|---|---|---|---|---|
| 0 | ∞ | 0.030 | | | Light-emitting unit |
| 1 | 0.15000 | 0.300 | 1.504 | 64 | |
| 2 | −0.15000 | 0.000 | | | |
| 3 | ∞ | 7.510 | | | |
| 4 | ∞ | 0.210 | 1.504 | 64 | Cover glass |
| 5 | ∞ | 0.000 | | | |
| 6 | ∞ | 0.300 | | | Stop surface |
| 7 | Refer below | 0.670 | 1.531 | 56 | Coupling lens |
| 8 | ∞ | 0.000 | | | |
| 9 | ∞ | 5.389 | | | |
| 10 | ∞ | 0.000 | | | Optical fiber |

TABLE 1-continued (The 7th surface data of the upward system)

| | | Surface No. | |
|---|---|---|---|
| | | 7-1 | 7-2 |
| Range | | 0 mm ≦ h ≦ 0.35 mm | 0.35 mm ≦ h |
| Curvature radius, | r | 1.87345E+00 | 1.87345E+00 |
| Conic constant, | κ | 5.75314E−01 | 5.75314E−01 |
| Offset amount of aspheric surface, | A0 | 0.00000E+00 | −2.24880E−02 |
| | A4 | −2.71295E−02 | −2.71295E−02 |
| Aspheric surface coefficients | A6 | −5.02610E−02 | −5.02610E−02 |
| | A8 | 1.59812E−01 | 1.59812E−01 |
| | A10 | −2.3620E−01 | −2.36205E−01 |

Downward system

| Surface No. | Curvature radius | Thickness | n(1.49 μm) | vd | note |
|---|---|---|---|---|---|
| 0 | ∞ | 5.389 | | | Optical fiber |
| 1 | ∞ | 0.670 | 1.530 | 56 | Coupling lens |
| 2 | Refer below | 0.000 | | | |
| 3 | ∞ | 0.030 | | | Stop surface |
| 4 | ∞ | 0.210 | 1.501 | 64 | Cover glass |
| 5 | ∞ | 0.000 | | | |
| 6 | ∞ | 8.560 | | | |
| 7 | ∞ | 0.000 | | | Light-emitting unit |

(The 1st-surface data of downward system)

| | | Surface No. 1 |
|---|---|---|
| Diffraction order | | 1st-order |
| Blaze wavelength (nm) | | 1490 |
| Coefficients of optical path difference function $\phi_b$ | c1 | −6.27368E−02 |
| | c2 | −1.59559E−04 |
| | c3 | 4.58693E−03 |

(The 2nd-surface data of downward system)

| | | Surface No. | |
|---|---|---|---|
| | | 2-1 | 2-2 |
| Range | | 0 mm ≦ h ≦ 0.35 mm | 0.35 mm ≦ h |
| Curvature radius, | r | −1.87345E+00 | −1.87345E+00 |
| Conic constant, | κ | 5.75314E−01 | 5.75314E−01 |
| Offset amount of aspheric surface, | A0 | 0.00000E+00 | 2.24880E−02 |
| | A4 | 2.71295E−02 | 2.71295E−02 |
| Aspheric surface coefficient | A6 | 5.02610E−02 | 5.02610E−02 |
| | A8 | −1.59812E−01 | −1.59812E−01 |
| | A10 | 2.36205E−01 | 2.36205E−01 |

| | With NPS | Without NPS |
|---|---|---|
| Upward coupling efficiency | | |
| 0° C. | 66% | 65% |
| 25° C. (reference) | 73% | 75% |
| 70° C. | 70% | 47% |
| Downward coupling efficiency | | |
| 0° C. | 93% | 92% |
| 25° C. (reference) | 94% | 94% |
| 70° C. | 90% | 88% |

Phase structure (conditional expression comparison)

| NAn/NA0 | 0.610 |
|---|---|
| Sn/S0 | 0.372 |

Figure 10A:
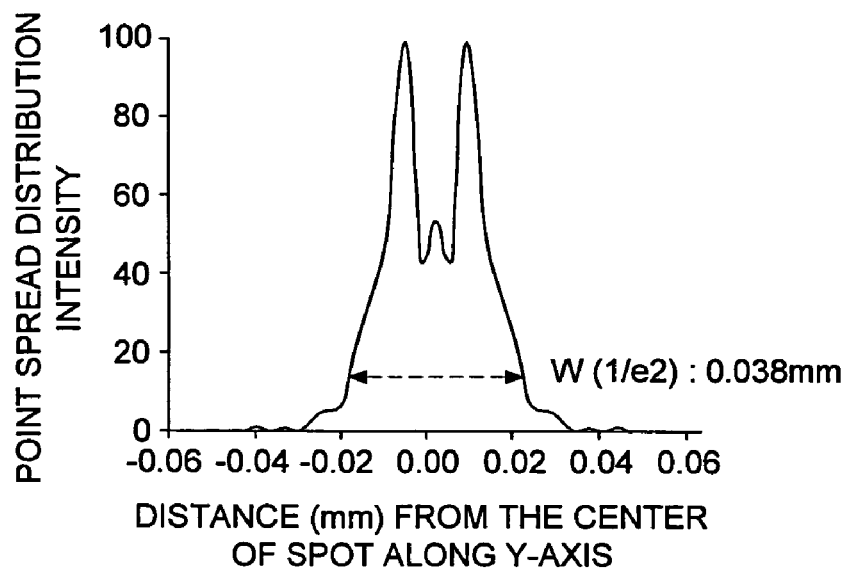
FIGS. 10(*a*) and 10(*b*) are views showing spot shapes on the end surface of the optical fiber, and the vertical axis shows the point image intensity and the horizontal axis shows the distance from the spot center.
Figure 10B:
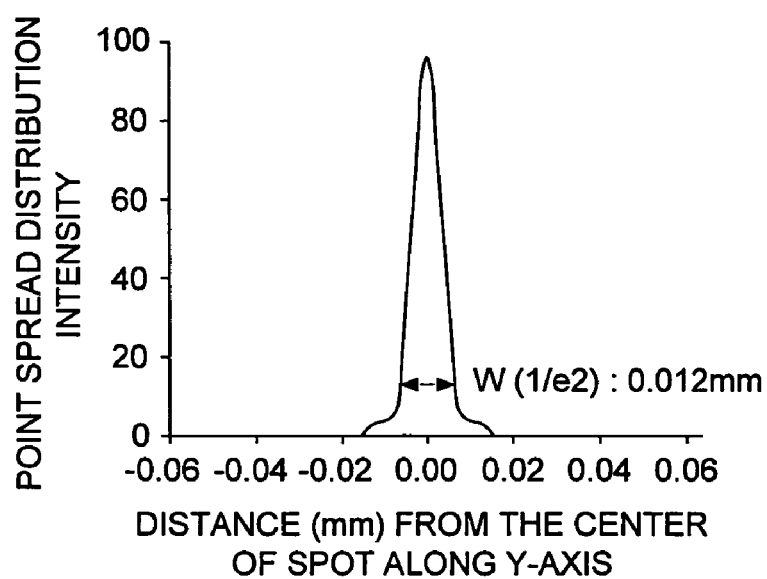

FIGS. 10(a) and 10(b) are views comparatively showing the spot shape on the optical fiber end surface converged in the first optical element without the phase structure NPS when the ambient temperature is increased to 70° C., and the spot shape on the optical fiber end surface converged in the first optical element with the phase structure NPS. Herein, the spot diameter is represented by $W(1/e^2)$ which is a full width of at $1/e^2$ maximum intensity of the point spread distribution of the converged spot. As clearly shown in FIGS. 10(*a*) and 10(*b*), the spot diameter is reduced, and the defocus can be suppressed when the phase structure is provided.

Example 2

An Example of the first optical element which can be used for the second embodiment will be described below. FIG. 11 is a sectional view of the first optical surface OE according to Example 2. Table 2 shows the lens data of Example 2. The first optical element OE forms the phase structure (which is abridged as NPS) of 3 ring-shaped zones OP1, OP2 and OP3 on the optical surface as the optical functional surfaces. The depth d1 along the optical axis of the lowest and innermost ring-shaped zone OP1 against the outermost ring-shaped zone OP3 (a step difference amount along the optical axis) is 0.04498 mm. The depth d2 along the optical axis of the next innermost ring-shaped zone OP2 against the outermost ring-shaped zone OP3 which is a step difference amount along the optical axis is 0.02249 mm. The step difference does not change a light converging property of the first optical element OE for the wavelength λ1 because there is provided the step difference with a depth d1 (=d) along the optical axis corresponding to an optical path difference of 16×λ1 (nm) to the light flux with the wavelength λ1 passing through the 2-3th surface (OP3) compared to the light flux with the wavelength λ1 passing through the 2-1th surface (OP1) and the step difference with a depth d2 (=d) along the optical axis corresponding to an optical path difference of 8×λ1 (nm) to the light flux with the wavelength λ1 passing through the 2-2th surface (OP2) compared to the light flux with the wavelength λ1 passing through the 2-1th surface (OP1) in the downward system. On the other hand, the step difference with a depth d2 along the optical axis corresponds to an optical path difference of almost 9×λ2 (nm) to the light flux with the wavelength λ2 passing through the 7-2th surface (OP2) compared to the light flux with the wavelength λ1 passing through the 7-1th surface (OP1) in the upward-system. The step difference with a depth d1 along the optical axis corresponds to an optical path difference of almost 18×λ2 (nm) to the light flux with the wavelength λ2 passing through the 7-3th surface (OP3) compared to the light flux with the wavelength λ1 passing through the 7-1th surface (OP1) in the upward system. At that time, the step difference also does not change a light converging property of the first optical element OE for the wavelength λ2 on the reference temperature.

Herein, the phase structure NPS is a structure having the temperature correction function. As shown in Table 2, the structure provided with the phase structure NPS suppresses the lowering of the upward coupling efficiency from 63% to 14% when the temperature rises from the reference temperature 25° C. to 70° C., as compared to the structure without NPS. When the temperature rises from the reference temperature 25° C. to 70° C., the structure without NPS provides the coupling efficiency which is 15% to the coupling efficiency of the structure on the reference temperature, however, the structure with NPS provides the coupling efficiency which is about 80% to the coupling efficiency of the structure on the reference temperature. The structure provided with the phase structure NPS suppresses the lowering of the downward coupling efficiency from 5% to 4%, when the temperature rises from the reference temperature 25° C. to 70° C., as compared to the structure without NPS. As it can be shown, the temperature property of the optical communication module in upward and downward can be respectively improved. Hereupon, the focal length f of the first optical element 7.00 mm in Example 2.

Further, the downward coupling efficiency is estimated by using the rate of the φ80 μm encircled energy (that is, the light amount entering on the photodiode with φ80 μm).

TABLE 2

|  | Upward | Downward |
| --- | --- | --- |
| Reference wavelength (nm) | 1310 | 1490 |
| Image surface side numerical aperture | 0.428 | 0.10 |

Upward system

| Surface No. | Curvature radius | Thickness | n(1.31 μm) | νd | note |
| --- | --- | --- | --- | --- | --- |
| 0 | ∞ | 0.030 |  |  | Light-emitting unit |
| 1 | 0.15000 | 0.300 | 1.504 | 64 |  |
| 2 | −0.15000 | 0.000 |  |  |  |
| 3 | ∞ | 16.404 |  |  |  |
| 4 | ∞ | 0.210 | 1.504 | 64 | Cover glass |
| 5 | ∞ | 0.000 |  |  |  |
| 6 | ∞ | 0.300 |  |  | Stop surface |
| 7 | Refer below | 0.670 | 1.531 | 56 | Coupling lens |
| 8 | ∞ | 0.000 |  |  |  |
| 9 | ∞ | 10.933 |  |  |  |
| 10 | ∞ | 0.000 |  |  | Optical fiber |

(The 7th surface data of upward system)

|  |  | Surface No. | | |
| --- | --- | --- | --- | --- |
|  |  | 7-1 | 7-2 | 7-3 |
| Range |  | 0 mm ≦ h ≦ 0.53 mm | 0.53 mm ≦ h ≦ 0.75 mm | 0.75 mm ≦ h |
| Curvature radius, | r | 3.71796E+00 | 3.71796E+00 | 3.71796E+00 |
| Conic constant, | κ | 5.47970E+00 | 5.47970E+00 | 5.47970E+00 |
| Offset amount of aspheric surface, Aspheric surface coefficient | A0 | 0.00000E+00 | −2.24880E−02 | −4.49760E−02 |
|  | A4 | −9.31064E−03 | −9.31064E−03 | −9.31064E−03 |
|  | A6 | −1.61642E−02 | −1.61642E−02 | −1.61642E−02 |
|  | A8 | 9.75546E−03 | 9.75546E−03 | 9.75546E−03 |
|  | A10 | −4.16446E−03 | −4.16446E−03 | −4.16446E−03 |

Downward system

| Surface No. | Radius of curvature | Thickness | n(1.49 μm) | νd | note |
| --- | --- | --- | --- | --- | --- |
| 0 | ∞ | 10.933 |  |  | Optical fiber |
| 1 | ∞ | 0.670 | 1.530 | 56 | Coupling lens |
| 2 | Refer below | 0.000 |  |  |  |
| 3 | ∞ | 0.030 |  |  | Stop surface |
| 4 | ∞ | 0.210 | 1.501 | 64 | Cover glass |
| 5 | ∞ | 0.000 |  |  |  |
| 6 | ∞ | 17.395 |  |  |  |
| 7 | ∞ | 0.000 |  |  | Light-emitting unit |

TABLE 2-continued (The 1st-surface data of downward system)

| | | Surface No. 1 |
|---|---|---|
| Diffraction order | | 1st-order |
| Blaze wavelength (nm) | | 1490 |
| Coefficients of optical path difference function $\phi_b$ | c1 | −6.27368E−02 |
| | c2 | 5.86493E−05 |
| | c3 | 1.08124E−03 |

(The 2nd surface data of downward system)

| | | Surface No. | | |
|---|---|---|---|---|
| | | 2-1 | 2-2 | 2-3 |
| Range | | 0 mm ≦ h ≦ 0.53 mm | 0.53 mm ≦ h ≦ 0.75 mm | 0.75 mm ≦ h |
| Curvature radius, | r | −3.71796E+00 | −3.71796E+00 | −3.71796E+00 |
| Conic constant, | κ | 5.47970E+00 | 5.47970E+00 | 5.47970E+00 |
| Offset amount of aspheric surface, | A0 | 0.00000E+00 | 2.24880E−02 | 4.49760E−02 |
| Aspheric surface coefficient | A4 | 9.31064E−03 | 9.31064E−03 | 9.31064E−03 |
| | A6 | 1.61642E−02 | 1.61642E−02 | 1.61642E−02 |
| | A8 | −9.75546E−03 | −9.75546E−03 | −9.75546E−03 |
| | A10 | 4.16446E−03 | 4.16446E−03 | 4.16446E−03 |

| | With NPS | Without NPS |
|---|---|---|
| Upward coupling efficiency | | |
| 0° C. | 56% | 41% |
| 25° C. (reference) | 69% | 74% |
| 70° C. | 56% | 11% |
| Downward coupling efficiency | | |
| 0° C. | 99% | 96% |
| 25° C. (reference) | 97% | 97% |
| 70° C. | 93% | 92% |

Phase structure (conditional expression comparison)

| NAn/NA0 | 0.669 |
|---|---|
| SN/S0 | 0.448 |

Example 3

An Example of the first optical element which can be used for the third embodiment will be described below.

FIG. 9 is a sectional view of the first optical surface OE according to Example 3. Table 3 shows the lens data of Example 3. The first optical element OE forms the phase structure (which is abridged as NPS) of 2 ring-shaped zones OP1 and OP2 on the optical surface as the optical functional surfaces. The depth d along the optical axis of the lowest ring-shaped zone OP1 against the outermost ring-shaped zone OP2 (a step difference amount along the optical axis) is 0.02249 mm. The step difference does not change a light converging property of the first optical element OE for the wavelength λ1 because there is provided the step difference with a depth d along the optical axis corresponding to an optical path difference of 8×λ1 (nm) to the light flux with the wavelength λ1 passing through the 2-2th surface (OP2) compared to the light flux with the wavelength λ1 passing through the 2-1th surface (OP1) in the downward system. On the other hand, the step difference with a depth d along the optical axis corresponds to an optical path difference of almost 9×λ2 (nm) to the light flux with the wavelength λ2 passing through the 7-2th surface (OP2) compared to the light flux with the wavelength λ1 passing through the 7-1th surface (OP1) in the upward system. At that time, the step difference also does not change a light converging property of the first optical element OE for the wavelength λ2 on the reference temperature.

Herein, the phase structure NPS is a structure having the temperature correction function. As shown in Table 3, the structure provided with the phase structure NPS suppresses the lowering of the upward coupling efficiency from 28% to 3%, when the temperature rises from the reference temperature 25° C. to 70° C., as compared to the structure without NPS. When the temperature rises from the reference temperature 25° C. to 70° C., the structure without NPS provides the coupling efficiency which is 60% to the coupling efficiency of the structure on the reference temperature, however, the structure with NPS provides the coupling efficiency which is about 90% to the coupling efficiency of the structure on the reference temperature. The structure provided with the phase structure NPS suppresses the lowering of the downward coupling efficiency from 6% to 4%, when the temperature rises from the reference temperature 25° C. to 70° C., as compared to the structure without NPS. As it can be shown, the temperature property of the optical communication module in upward and downward can be respectively improved. Hereupon, the focal length f of the first optical element=3.53 mm in Example 3.

Further, the downward coupling efficiency is estimated by using the rate of the φ40 μm encircled energy (that is, the light amount entering on the photodiode with φ40 μm). The table 3 shows the downward coupling efficiencies of the light flux with wavelength λ1=1.49 for reference.

TABLE 3

| | Upward | Downward | |
|---|---|---|---|
| Reference wavelength (nm) | 1310 | 1490 | 1550 |
| Image surface side numerical aperture | 0.428 | 0.10 | 0.10 |

Upward system

| Surface No. | Curvature radius | Thickness | n(1.31 μm) | vd | note |
|---|---|---|---|---|---|
| 0 | ∞ | 0.030 | | | Light-emitting unit |
| 1 | 0.15000 | 0.300 | 1.504 | 64 | |
| 2 | −0.15000 | 0.000 | | | |
| 3 | ∞ | 7.510 | | | |
| 4 | ∞ | 0.210 | 1.504 | 64 | Cover glass |
| 5 | ∞ | 0.000 | | | |
| 6 | ∞ | 0.300 | | | Stop surface |
| 7 | Refer below | 0.670 | 1.531 | 56 | Coupling lens |
| 8 | ∞ | 0.000 | | | |
| 9 | ∞ | 5.389 | | | |
| 10 | ∞ | 0.000 | | | Optical fiber |

(The 7th surface data of upward system)

| | | Surface No. | |
|---|---|---|---|
| | | 7-1 | 7-2 |
| Range | | 0 mm ≦ h ≦ 0.35 mm | 0.35 mm ≦ h |
| Curvature radius, | r | 1.87345E+00 | 1.87345E+00 |
| Conic constant, | κ | 5.75314E−01 | 5.75314E−01 |
| Offset amount of aspheric surface, | A0 | 0.00000E+00 | −2.24880E−02 |
| | A4 | −2.71295E−02 | −2.71295E−02 |

TABLE 3-continued

| | | | | |
|---|---|---|---|---|
| Aspheric surface coefficient | A6 | | −5.02610E−02 | −5.02610E−02 |
| | A8 | | 1.59812E−01 | 1.59812E−01 |
| | A10 | | −2.36205E−01 | −2.36205E−01 |

Downward system

| Surface No. | Radius of curvature | Thickness | n (1.49 μm) | vd | note |
|---|---|---|---|---|---|
| 0 | ∞ | 5.389 | | | Optical fiber |
| 1 | ∞ | 0.670 | 1.530 | 56 | Coupling lens |
| 2 | Refer below | 0.000 | | | |
| 3 | ∞ | 0.030 | | | Stop surface |
| 4 | ∞ | 0.210 | 1.501 | 64 | Cover glass |
| 5 | ∞ | 0.000 | | | |
| 6 | ∞ | 8.560 | | | |
| 7 | ∞ | 0.000 | | | Light-emitting unit |

(The 1st-surface data of downward system)

| | Surface No. 1 | |
|---|---|---|
| Reference wavelength (nm) | 1490 | 1550 |
| Diffraction order | 2nd-order | 3rd-order |
| Blaze wavelength (nm) | 1490 | 1490 |
| Coefficients of optical path difference function $\phi_b$ | c1 | −3.13684E−02 |
| | c2 | −7.51527E−05 |
| | c3 | 2.30274E−03 |

(The 2nd-surface data of downward system)

| | Surface No. | |
|---|---|---|
| | 2-1 | 2-2 |
| Range | 0 mm ≦ h ≦ 0.35 mm | 0.35 mm ≦ h |
| Curvature radius, r | −1.87345E+00 | −1.87345E+00 |
| Conic constant, κ | 5.75314E−01 | 5.75314E−01 |
| Offset amount of aspheric surface, A0 | 0.00000E+00 | 2.24880E−02 |
| Aspheric surface coefficient A4 | 2.71295E−02 | 2.71295E−02 |
| A6 | 5.02610E−02 | 5.02610E−02 |
| A8 | −1.59812E−01 | −1.59812E−01 |
| A10 | 2.36205E−01 | 2.36205E−01 |

| | With NPS | Without NPS |
|---|---|---|
| Upward coupling efficiency | | |
| 0° C. | 66% | 60% |
| 25° C. (reference) | 73% | 75% |
| 70° C. | 70% | 47% |
| Downward coupling efficiency | | |
| 0° C. | 93% | 92% |
| 25° C. (reference) | 94% | 94% |
| 70° C. | 89% | 88% |

Phase structure (conditional expression comparison

| NAn/NA0 | 0.610 |
|---|---|
| Sn/S0 | 0.372 |

Example 4

An Example of the fourth optical element which can be used for the fourth embodiment will be described below.

FIG. 9 is a sectional view of the first optical surface OE according to Example 4. The decentered amount (mm) in Table 4 means a decentered amount of the optical axis along the Y axis, for example, the decentered amount of the 0th surface of the downward system represents the position of the optical fiber decentered in the optical communication module. In Table 4, the lens data of Example 4 is shown. The first optical element OE forms the phase structure (which is abridged as NPS) of 2 ring-shaped zones OP1 and OP2 on the optical surface as the optical functional surfaces. The depth d along the optical axis of the lowest ring-shaped zone OP1 against the outermost ring-shaped zone OP2 which is a step difference amount along the optical axis is 0.02249 mm. The step difference does not change a light converging property of the first optical element OE for the wavelength λ1 because there is provided the step difference with a depth d along the optical axis corresponding to an optical path difference of 8×λ1 (nm) to the light flux with the wavelength λ1 passing through the 2-2th surface (OP2) compared to the light flux with the wavelength λ1 passing through the 2-1th surface (OP1) in the downward system. On the other hand, the step difference with a depth d along the optical axis corresponds to an optical path difference of almost 9×λ2 (nm) to the light flux with the wavelength λ2 passing through the 8-2th surface (OP2) compared to the light flux with the wavelength λ1 passing through the 8-1th surface (OP1) in the upward system. At that time, the step difference also does not change a light converging property of the first optical element OE for the wavelength λ2 on the reference temperature.

Herein, the phase structure NPS is a structure having the temperature correction function. As shown in Table 4, the structure provided with the phase structure NPS suppresses the lowering of the upward coupling efficiency from 28% to 3%, when the temperature rises from the reference temperature 25° C. to 70° C., as compared to the structure without NPS. When the temperature rises from the reference temperature 25° C. to 70° C., the structure without NPS provides the coupling efficiency which is 47% to the coupling efficiency of the structure on the reference temperature, however, the structure with NPS provides the coupling efficiency which is about 84% to the coupling efficiency of the structure on the reference temperature. The structure provided with the phase structure NPS suppresses the lowering of the downward coupling efficiency from 6% to 4%, when the temperature rises from the reference temperature 25° C. to 70° C. as compared to the structure without NPS. As it can be shown, the temperature property of the optical communication module in upward and downward can be respectively improved. Hereupon, the focal length f of the first optical element=4.17 mm in Example 4.

Further, the downward coupling efficiency is estimated by using the rate of the φ40 μm encircled energy (that is, the light amount entering on the photodiode with φ40 μm).

TABLE 4

| | Upward | Downward |
|---|---|---|
| Reference wavelength (nm) | 1310 | 1490 |
| Image surface side numerical aperture | 0.428 | 0.10 |

Upward system

| Surface No. | Curvature radius | Thickness | n(1.31 μm) | vd | Decentered amount (mm) | note |
|---|---|---|---|---|---|---|
| 0 | ∞ | 0.0293 | | | | Light-emitting unit |
| 1 | 0.15000 | 0.300 | 1.504 | 64 | 0.0110 | |
| 2 | −0.15000 | 0.000 | | | | |
| 3 | ∞ | 8.813 | | | | |
| 4 | ∞ | 0.210 | 1.504 | 64 | | Cover glass |
| 5 | ∞ | 0.000 | | | | |
| 6 | ∞ | 0.300 | | | 0.4537 | Stop surface |

TABLE 4-continued

| | | | | | | |
|---|---|---|---|---|---|---|
| 7 | ∞ | 0.000 | | | | |
| 8 | Refer below | 0.670 | 1.531 | 56 | | Coupling lens |
| 9 | ∞ | 0.000 | | | | |
| 10 | ∞ | 6.624 | | | | |
| 11 | ∞ | 0.000 | | | 0.3479 | Optical fiber |

(The 8th surface data of upward system)

| | | Surface No. | |
|---|---|---|---|
| | | 8-1 | 8-2 |
| Range | | 0 mm ≦ h ≦ 0.40 mm | 0.40 mm ≦ h |
| Curvature radius, | r | 2.21354E+00 | 2.21354E+00 |
| Conic constant, | κ | −2.05430E+01 | −2.05430E+01 |
| Offset amount of aspheric surface, | A0 | 0.00000E+00 | −2.24880E−02 |
| Aspheric surface coefficient | A4 | 1.94929E−01 | 1.94929E−01 |
| | A6 | −2.20172E−01 | −2.20172E−01 |
| | A8 | 1.35943E−01 | 1.35943E−01 |
| | A10 | −2.81001E−02 | −2.81001E−02 |

Downward system

| Surface No. | Curvature radius | Thickness | n(1.49 μm) | vd | Decentered amount (mm) | note |
|---|---|---|---|---|---|---|
| 0 | ∞ | 6.624 | | | −0.3479 | Optical fiber |
| 1 | ∞ | 0.670 | 1.530 | 56 | 0.3479 | Coupling lens |
| 2 | Refer below | 0.000 | | | | |
| 3 | ∞ | 0.030 | | | | Stop surface |
| 4 | ∞ | 0.210 | 1.501 | 64 | | Cover glass |
| 5 | ∞ | 0.000 | | | | |
| 6 | ∞ | 10.033 | | | | |
| 7 | ∞ | 0.000 | | | 0.1498 | Light-emitting unit |

(The 1st-surface data of downward system)

| | Surface No. 1 |
|---|---|
| Reference wavelength (nm) | 1490 |
| Diffraction order | 1st-order |
| Blaze wavelength (nm) | 1490 |
| Coefficient of Optical path difference function $\phi_b$ | c1    −3.72500E−02 |

(The 2nd-surface data of downward system)

| | | Surface No. | |
|---|---|---|---|
| | | 2-1 | 2-2 |
| Range | | 0 mm ≦ h ≦ 0.40 mm | 0.40 mm ≦ h |
| Curvature radius, | r | 2.21354E+00 | 2.21354E+00 |
| Conic constant, | κ | 2.05430E+01 | 2.05430E+01 |
| Offset amount of aspheric surface, | A0 | 0.00000E+00 | 2.24880E−02 |
| Aspheric surface coefficient | A4 | −1.94929E−01 | −1.94929E−01 |
| | A6 | 2.20172E−01 | 2.20172E−01 |
| | A8 | −1.35943E−02 | −1.35943E−02 |
| | A10 | 2.81001E−02 | 2.81001E−02 |

| | With NPS | Without NPS |
|---|---|---|
| Upward coupling efficiency | | |
| 0° C. | 66% | 54% |
| 25° C. (reference) | 76% | 81% |
| 70° C. | 64% | 38% |
| Downward coupling efficiency | | |
| 0° C. | 93% | 92% |
| 25° C. (reference) | 95% | 95% |
| 70° C. | 90% | 89% |

| Phase structure (conditional expression comparison) | |
|---|---|
| NAn/NA0 | 0.521 |
| Sn/S0 | 0.272 |

Figure 13A:
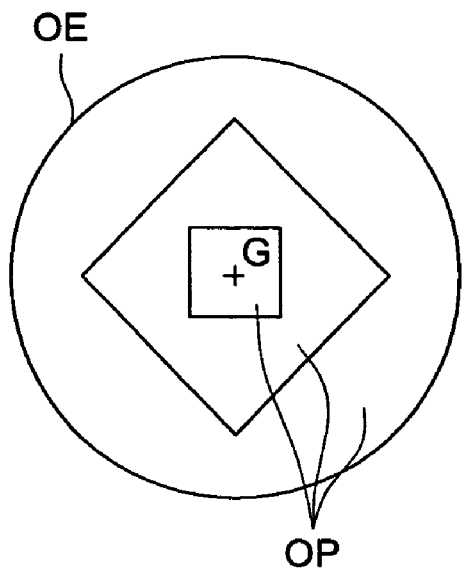
FIGS. 13(*a*) and 13(*b*) are views showing a modification example of the first optical element OE, and FIG. 13(*a*) is a view viewed in the optical axis direction, and FIG. 13(*b*) is a view viewed in the orthogonal direction to the optical axis.
Figure 13B:
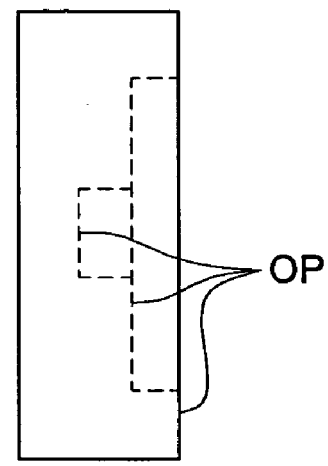
Figure 14A:
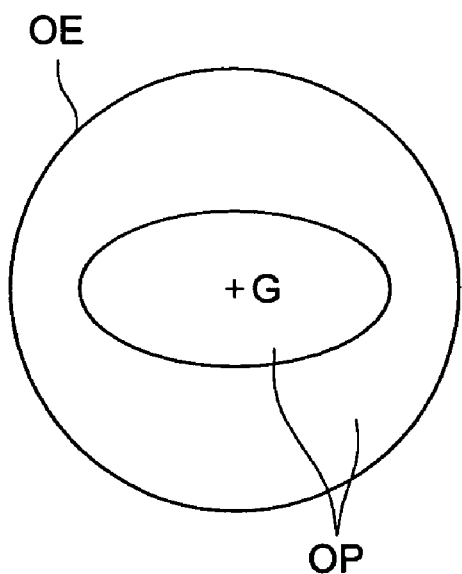
FIGS. 14(*a*) and 14(*b*) are views showing a modification example of the first optical element OE, and FIG. 14(*a*) is a view viewed in the optical axis direction, and FIG. 14(*b*) is a view viewed in the orthogonal direction to the optical axis.
Figure 14B:
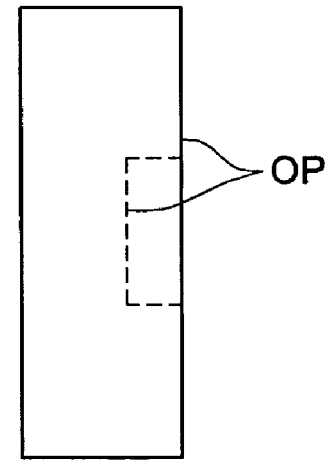

Herein, in the first optical element OE, the shapes of the optical functional surfaces OP are not limited to the ring-shaped zones. For example, as shown in FIGS. 12(a) and 12(b), at least one of the optical functional surfaces OP (divided into 2 surfaces) may be triangular. As shown in FIGS. 13(a) and 13(b), at least one of the optical functional surfaces OP (divided into 3 surfaces) may also be rectangular or other polygons. As shown in FIGS. 14(a) and 14(b), at least one of the optical functional surfaces OP (divided into 2 surfaces) may also be oval. However, it is preferable that each of the divided optical functional surfaces has a geometric center of gravity G positioned at an optical axis.

As described above, the present invention is described referring to embodiments. However, the present invention should not be construed by limiting to the above embodiments, and it is of course that the modification and improvement can be appropriately made.

What is claimed is:

1. An optical communication module comprising:
   a first light-receiving element with a receiving surface in which a light flux with a wavelength $\lambda 1$ emitted from an end surface of an optical fiber enters;
   a light-emitting element for emitting a light flux with a wavelength $\lambda 2$ ($\lambda 1 \neq \lambda 2$); and
   a first optical element arranged between the first light-receiving element and the light-emitting element, and the end surface of the optical fiber, converging the light flux with the wavelength $\lambda 1$ emitted from the end surface of the optical fiber on the receiving surface of the first light-receiving element, and converging the light flux with the wavelength $\lambda 2$ emitted from the light-emitting element on the end surface of the optical fiber,
   wherein the first optical element comprises a first optical surface with a positive refractive power and a second optical surface having a diffractive structure generating a m-th order diffracted light flux with a larger light amount than any generated diffracted light fluxes with the other diffraction order when the light flux with the wavelength $\lambda 2$ passes through the diffractive structure, and generating a n-th order diffracted light flux with a larger light amount than any generated diffracted light flux with the other diffraction order when the light flux with the wavelength $\lambda 1$ passes through the diffractive structure, where m is 0, n is an integer excluding 0, and
   one of the first optical surface and the second optical surface is divided into a plurality of optical functional surfaces provided with at least one step difference extending along the optical axis, the plurality of optical functional surfaces include at least a first optical functional surface including an optical axis and a second optical functional surface surrounding the first optical functional surface through a step difference extending along the optical axis, a number of the divided optical functional surfaces is 2 or 3.

2. The optical communication module of claim 1, further comprising a second optical element arranged between the light-emitting element and the first optical element, wherein the second optical element ahs a positive refractive power.

3. The optical communication module of claim 1, wherein each of the divided optical functional surfaces has a geometric center of gravity positioned at an optical axis.

4. The optical communication module of claim 1, wherein at least one of the divided optical functional surfaces is a ring-shaped zone whose center is placed on the optical axis.

5. The optical communication module of claim 1,
wherein the diffractive structure generates a 0-th order diffracted light flux with a larger light amount than any generated diffracted light flux with the other diffraction order when the light flux with the wavelength $\lambda 2$ passes through the diffractive structure, and generates the n-th order diffracted light flux with a larger light amount than any generated diffracted light flux with the other diffraction order when the light flux with the wavelength $\lambda 1$ passes through the diffractive structure, where n is an integer excluding 0, one of the first optical surface or the second optical surface is divided into a plurality of optical functional surfaces provided with a step difference extending along the optical axis, the plurality of optical functional surfaces includes the first optical functional surface and the second optical functional surface, and the divided optical functional surfaces satisfy $$0.05 \leq Sn/S0 \leq 0.68$$

where Sn is an area of a region such that an optical surface having the divided optical functional surfaces is projected in a direction of the optical axis onto a surface perpendicular to the optical axis, and S0 is an area of a region such that when an outermost optical functional surface represents a farthest optical functional surface from the optical axis among the divided optical functional surfaces, the rest of divided optical functional surfaces inside of the outermost optical functional surface is projected along the optical axis to a perpendicular surface to the optical axis.

6. The optical communication module of claim 5, wherein the divided optical functional surfaces satisfy $$0.08 \leq Sn/S0 \leq 0.58.$$

7. The optical communication module of claim 5, wherein at least one of the divided optical functional surfaces is a ring-shaped zone whose center is placed on the optical axis.

8. The optical communication module of claim 7, wherein the divided optical functional surfaces are ring-shaped zones whose centers are placed on the optical axis and satisfy $$0.22 \leq NAn/NA0 \leq 0.83,$$

where NAn is a numerical aperture of a region corresponding to the rest of divided optical functional surfaces excluding the outermost optical functional surface, and NA0 is a numerical aperture of the optical surface having the ring-shaped zones.

9. The optical communication module of claim 1,
wherein the diffractive structure generates a 0-th order diffracted light flux with a larger light amount than any generated diffracted light flux with the other diffraction order when the light flux with the wavelength $\lambda 2$ passes through the diffractive structure, and generates the n-th order diffracted light flux with a larger light amount than any generated diffracted light flux with the other diffraction order when the light flux with the wavelength $\lambda 1$ passes through the diffractive structure, where n is an integer excluding 0, one of the first optical surface and the second optical surface is divided into a plurality of optical functional surfaces provided with a step difference extending along the optical axis, the plurality of optical functional surfaces include the first optical functional surface and the second optical functional surface, and the divided optical functional surfaces satisfy $$3.1 \ (/mm) \times \lambda 2 \leq d/f \leq 5.8 \ (/mm),$$

where d is a step difference amount, and f is a focal length of the first optical element.

10. The optical communication module of claim 9, wherein the divided optical functional surfaces satisfy $$2.9 \ (/mm) \times \lambda 1 \leq d/f \leq 5.4 \ (/mm).$$

11. The optical communication module of claim 9, wherein at least one of the divided optical functional surfaces is a ring-shaped zone whose center is placed on the optical axis.

12. The optical communication module of claim 1, wherein the first optical surface is divided into at least the first optical functional surface including the optical axis and the second optical functional surface surrounding the first optical functional surface and provided through a step difference extending in a direction such that a place on the first optical element with the second optical functional surface has a larger thickness along the optical axis than a place on the first optical element with the first optical functional surface.

13. The optical communication module of claim 1, wherein the wavelength $\lambda 1$ and the wavelength $\lambda 2$ satisfy following expressions:

$$1480 \ nm \leq \lambda 1 \leq 1500 \ nm$$

$$1280 \ nm \leq \lambda 2 \leq 1340 \ nm.$$

14. The optical communication module of claim 1, further comprising a second light-receiving element with a receiving surface in which a light flux with a wavelength $\lambda 3$ emitted from an end surface of the optical fiber enters, wherein the receiving surface of the second light-receiving element is different from receiving surface of the first light-receiving element, the diffractive structure generates a q-th order diffracted light flux with a larger amount than any generated diffracted light flux with the other diffraction order when the light flux with the wavelength $\lambda 3$ ($\lambda 1 \neq \lambda 3$ and $\lambda 2 \neq \lambda 3$) passes through the diffractive structure, where q is an integer satisfying m$\neq$q, and the first optical element converges the light flux with the wavelength $\lambda 3$ emitted from the end surface of the optical fiber enters on the receiving surface of the second light-receiving element.

15. The optical communication module of claim 14, wherein the wavelength $\lambda 1$, the wavelength $\lambda 2$, and the wavelength $\lambda 3$ satisfy following expressions:

$$1480 \ nm \leq \lambda 1 \leq 1500 \ nm$$

$$1280 \ nm \leq \lambda 2 \leq 1340 \ nm$$

$$1530 \ nm \leq \lambda 3 \leq 1570 \ nm.$$

16. The optical communication module of claim 1, wherein the end surface of the optical fiber inclines to an axis of the optical fiber.

17. The optical communication module of claim 1, wherein the end surface of the optical fiber is perpendicular to an axis of the optical fiber.

18. The optical communication module of claim 1, wherein the diffractive structure generates a first order diffracted light flux with a larger light amount than any generated diffracted light flux with the other diffraction order when the light flux with the wavelength $\lambda 1$ passes through the diffractive structure.

19. The optical communication module of claim 1, wherein the diffractive structure is an echelon type diffractive structure periodically formed along a predefined direction.

20. The optical communication module of claim 1, wherein the first optical element is formed of resin.

21. The optical communication module of claim 1, wherein an optical surface having the first optical functional surface and the second optical functional surface comprises an optical path difference providing structure.

22. An optical element for use in an optical communication module and for arranged between a first light-receiving element and a light-emitting element, and an optical fiber, for converging a light flux with a wavelength $\lambda 1$ emitted from an end surface of an optical fiber on a light-receiving surface of the first light-receiving element, and for converging a light flux with a wavelength $\lambda 2$ ($\lambda 1 \neq \lambda 2$) emitted from the light-emitting element, the optical element comprising:

a first optical surface with a positive refractive power and a second optical surface having a diffractive structure generating a m-th order diffracted light flux with a larger light amount than any generated diffracted light flux with the other diffraction order when the light flux with the wavelength $\lambda 2$ passes through the diffractive structure, and generating a n-th order diffracted light flux with a larger light amount than any generated diffracted light flux with the other diffraction order when the light flux with the wavelength $\lambda 1$ passes through the diffractive structure, where m is 0, n is an integer excluding 0, wherein one of the first optical surface and the second optical surface is divided into a plurality of optical functional surfaces provided with at least one step difference extending along the optical axis, the plurality of optical functional surfaces include a first optical functional surface including an optical axis and a second optical functional surface surrounding the first optical functional surface and arranged through a step difference extending along the optical axis, a number of the divided optical functional surfaces is 2 or 3.

23. The optical element of claim 22, wherein the first optical surface is divided into at least the first optical functional surface including the optical axis and the second optical functional surface surrounding the first optical functional surface and provided through a step difference extending in a direction such that a place on the first optical element with the second optical functional surface has a larger thickness along the optical axis than a place on the first optical element with the first optical functional surface.

24. The optical element of claim 22, wherein the wavelength $\lambda 1$ and the wavelength $\lambda 2$ satisfy following expressions:

$$1480 \text{ nm} \leq \lambda 1 \leq 1500 \text{ nm}$$

$$1280 \text{ nm} \leq \lambda 2 \leq 1340 \text{ nm}.$$

25. The optical element of claim 22, wherein the diffractive structure generates a q-th order diffracted light flux with a larger light amount than any generated diffracted light flux with the other diffraction order when the light flux with the wavelength $\lambda 3$ passes through the diffractive structure, where q is an integer satisfying m≠q, $\lambda 1 \neq \lambda 3$, and $\lambda 2 \neq \lambda 3$, so as to converge the light flux with the wavelength $\lambda 3$ emitted from the end surface of the optical fiber enters on a receiving surface of a second light-receiving element which is different from the first light-receiving element.

26. The optical element of claim 25, wherein the wavelength $\lambda 1$, the wavelength $\lambda 2$, and the wavelength $\lambda 3$ satisfy following expressions:

$$1480 \text{ nm} \leq \lambda 1 \leq 1500 \text{ nm}$$

$$1280 \text{ nm} \leq \lambda 2 \leq 1340 \text{ nm}$$

$$1530 \text{ nm} \leq \lambda 3 \leq 1570 \text{ nm}.$$

* * * * *